(12) United States Patent
Amiruddin et al.

(10) Patent No.: US 8,993,177 B2
(45) Date of Patent: Mar. 31, 2015

(54) LITHIUM ION BATTERY WITH HIGH VOLTAGE ELECTROLYTES AND ADDITIVES

(75) Inventors: Shabab Amiruddin, Fremont, CA (US); Herman Lopez, Sunnyvale, CA (US)

(73) Assignee: Envia Systems, Inc., Newark, CA (US)

( * ) Notice: Subject to any disclaimer, the term of this patent is extended or adjusted under 35 U.S.C. 154(b) by 608 days.

(21) Appl. No.: 12/630,992

(22) Filed: Dec. 4, 2009

(65) Prior Publication Data

US 2011/0136019 A1 Jun. 9, 2011

(51) Int. Cl.
| | |
|---|---|
| H01M 10/0567 | (2010.01) |
| H01M 10/0569 | (2010.01) |
| H01M 10/0525 | (2010.01) |
| H01M 10/0568 | (2010.01) |
| H01M 4/505 | (2010.01) |
| H01M 4/525 | (2010.01) |

(52) U.S. Cl.
CPC ...... *H01M 10/0567* (2013.01); *H01M 10/0568* (2013.01); *H01M 10/0569* (2013.01); *H01M 4/505* (2013.01); *H01M 4/525* (2013.01); *H01M 10/0525* (2013.01); *Y02E 60/122* (2013.01)
USPC ........................................ 429/332

(58) Field of Classification Search
CPC ............. H01M 10/0567; H01M 10/0568; H01M 10/0569; H01M 10/0525; H01M 4/505; H01M 4/525; Y02E 60/122
USPC .......... 429/330, 332, 334, 307, 231.1, 231.3, 429/231.6, 231.8, 231.4, 306, 323
See application file for complete search history.

(56) References Cited

U.S. PATENT DOCUMENTS

| | | | |
|---|---|---|---|
| 4,857,423 A | 8/1989 | Abraham et al. | |
| 5,192,629 A | 3/1993 | Guyomard et al. | |
| 5,240,790 A | 8/1993 | Chua et al. | |
| 5,422,203 A | 6/1995 | Guyomard et al. | |
| 5,484,669 A | 1/1996 | Okuno et al. | |
| 5,514,488 A | 5/1996 | Hake et al. | |
| 5,521,027 A | 5/1996 | Okuno et al. | |
| RE35,818 E | 6/1998 | Tahara et al. | |
| 5,830,600 A | 11/1998 | Narang et al. | |
| 5,908,717 A | 6/1999 | Pendalwar et al. | |
| 5,922,494 A | 7/1999 | Barker et al. | |
| 5,994,000 A | 11/1999 | Ein-Eli et al. | |
| 5,998,065 A | 12/1999 | Tsutsumi et al. | |
| 6,045,951 A | 4/2000 | Wendsjo et al. | |
| 6,080,507 A | 6/2000 | Yu | |
| 6,153,338 A | 11/2000 | Gan et al. | |
| 6,171,723 B1 | 1/2001 | Loch et al. | |
| 6,183,718 B1 | 2/2001 | Barker et al. | |
| 6,235,427 B1 | 5/2001 | Idota et al. | |
| 6,251,822 B1 | 6/2001 | Peng et al. | |
| 6,291,107 B1 | 9/2001 | Shimizu | |
| 6,337,156 B1 | 1/2002 | Narang et al. | |
| 6,346,351 B1 | 2/2002 | Yde-Andersen et al. | |
| 6,383,687 B1 | 5/2002 | Gibbons et al. | |
| 6,420,071 B1 | 7/2002 | Lee et al. | |
| 6,444,370 B2 | 9/2002 | Barker et al. | |
| 6,455,200 B1 | 9/2002 | Prakash et al. | |
| 6,482,549 B2 | 11/2002 | Yoshimura et al. | |
| 6,489,063 B1 | 12/2002 | Billaud et al. | |
| 6,492,064 B1 | 12/2002 | Smart et al. | |
| 6,506,524 B1 | 1/2003 | McMillan et al. | |
| 6,511,767 B1 | 1/2003 | Calver et al. | |
| 6,528,208 B1 | 3/2003 | Thackeray et al. | |
| 6,616,715 B2 | 9/2003 | Kitoh et al. | |
| 6,645,671 B2 | 11/2003 | Tsutsumi et al. | |
| 6,677,082 B2 | 1/2004 | Thackeray et al. | |
| 6,680,143 B2 | 1/2004 | Thackeray et al. | |
| 6,682,849 B2 | 1/2004 | Narang et al. | |
| 6,692,874 B2 | 2/2004 | Kim et al. | |
| 6,730,429 B2 | 5/2004 | Thackeray et al. | |
| 6,746,804 B2 | 6/2004 | Gan et al. | |
| 6,749,648 B1 | 6/2004 | Kumar et al. | |
| 6,783,896 B2 | 8/2004 | Tsujioka et al. | |
| 6,787,267 B2 | 9/2004 | Tsujioka et al. | |
| 6,787,268 B2 | 9/2004 | Koike et al. | |
| 6,787,269 B2 | 9/2004 | Sekino et al. | |
| 6,855,458 B1 | 2/2005 | Kim et al. | |

(Continued)

FOREIGN PATENT DOCUMENTS

| | | |
|---|---|---|
| CN | 101587970 A | 11/2009 |
| JP | 07-065825 | 3/1995 |

(Continued)

OTHER PUBLICATIONS

Liu et al. "Effect of electrolyte additives in improving the cycle and calendar life of graphite/Li1.1[Ni1/3Co1/3Mn1/3]0.9O2 Li-ion cells", Journal of Power Sources (2007), 174(2), pp. 852-855.*

Arai et al. "Air Product's StabiLife™ Electrolyte Salts for Lithium Ion Batteries," Product Brochure; Air Products and Chemicals, Inc., Allentown, PA. 2009.

Aurbach et al. "Studies of cycling behavior, ageing, and interfacial reactions of LiNi0.5Mn1.5O4 and carbon electrodes for lithium-ion 5-V cells," J. of Power Sources 162 (2006) 780-789.

(Continued)

*Primary Examiner* — Laura Weiner

(74) *Attorney, Agent, or Firm* — Dardi & Herbert, PLLC; Peter S. Dardi

(57) ABSTRACT

Desirable electrolyte compositions are described that are suitable for high voltage lithium ion batteries with a rated charge voltage at least about 4.45 volts. The electrolyte compositions can comprise ethylene carbonate and solvent composition selected from the group consisting of dimethyl carbonate, methyl ethyl carbonate, γ-butyrolactone, γ-valerolactone or a combination thereof. The electrolyte can further comprise a stabilization additive. The electrolytes can be effectively used with lithium rich positive electrode active materials.

23 Claims, 12 Drawing Sheets

(56) References Cited

U.S. PATENT DOCUMENTS

| | | |
|---|---|---|
| 6,855,460 B2 | 2/2005 | Vaughey et al. |
| 6,884,546 B1 | 4/2005 | Fujita et al. |
| 6,936,382 B2 | 8/2005 | Mikhaylik et al. |
| 6,942,949 B2 | 9/2005 | Besenhard et al. |
| 6,951,699 B2 | 10/2005 | Yata et al. |
| 6,958,198 B2 | 10/2005 | Iwamoto et al. |
| 6,964,828 B2 | 11/2005 | Lu et al. |
| 7,022,145 B2 | 4/2006 | Kim et al. |
| 7,026,074 B2 | 4/2006 | Chen et al. |
| 7,033,702 B2 | 4/2006 | Dasgupta et al. |
| 7,074,523 B2 | 7/2006 | Arai et al. |
| 7,078,128 B2 | 7/2006 | Lu et al. |
| 7,135,252 B2 | 11/2006 | Thackeray et al. |
| 7,166,385 B2 | 1/2007 | Ishida et al. |
| 7,172,834 B1 | 2/2007 | Jow et al. |
| 7,186,479 B2 | 3/2007 | Krasnov et al. |
| 7,198,869 B2 | 4/2007 | Ghantous et al. |
| 7,201,994 B2 | 4/2007 | Watanabe et al. |
| 7,201,997 B2 | 4/2007 | Ishida et al. |
| 7,205,072 B2 | 4/2007 | Kang et al. |
| 7,214,446 B1 | 5/2007 | Bi et al. |
| 7,226,704 B2 | 6/2007 | Panitz et al. |
| 7,229,717 B2 | 6/2007 | Yamaguchi et al. |
| 7,235,330 B1 | 6/2007 | Fujimoto et al. |
| 7,235,334 B2 | 6/2007 | Kim et al. |
| 7,252,907 B2 | 8/2007 | Takeuchi et al. |
| 7,255,965 B2 | 8/2007 | Xu et al. |
| 7,273,682 B2 | 9/2007 | Park et al. |
| 7,311,993 B2 | 12/2007 | Ivanov et al. |
| 7,338,734 B2 | 3/2008 | Chiang et al. |
| 7,348,103 B2 | 3/2008 | Ivanov et al. |
| 7,351,494 B2 | 4/2008 | Hennige et al. |
| 7,368,071 B2 | 5/2008 | Dahn et al. |
| 7,378,190 B2 | 5/2008 | Yanai et al. |
| 7,416,813 B2 | 8/2008 | Fujihara et al. |
| 7,435,402 B2 | 10/2008 | Kang et al. |
| 7,452,631 B2 | 11/2008 | Kitao et al. |
| 7,452,636 B2 | 11/2008 | Yanai et al. |
| 7,455,933 B2 | 11/2008 | Shimura et al. |
| 7,465,517 B2 | 12/2008 | Ivanov et al. |
| 7,482,101 B2 | 1/2009 | Tsuda et al. |
| 7,491,471 B2 | 2/2009 | Yamaguchi et al. |
| 7,497,285 B1 | 3/2009 | Radev |
| 7,507,503 B2 | 3/2009 | Amine et al. |
| 7,510,803 B2 | 3/2009 | Adachi et al. |
| 7,544,443 B2 | 6/2009 | Fujihara et al. |
| 7,718,306 B2 | 5/2010 | Cheon et al. |
| 7,754,389 B2 | 7/2010 | Yamaguchi et al. |
| 8,399,136 B2 | 3/2013 | Ohashi et al. |
| 2001/0031396 A1 | 10/2001 | Tsutsumi et al. |
| 2002/0037458 A1 | 3/2002 | Yamagushi et al. |
| 2002/0084445 A1 | 7/2002 | Garbe |
| 2002/0102462 A1 | 8/2002 | Huggins et al. |
| 2002/0102466 A1 | 8/2002 | Hwang et al. |
| 2002/0122973 A1 | 9/2002 | Manev et al. |
| 2003/0087155 A1 | 5/2003 | Cho et al. |
| 2003/0157014 A1 | 8/2003 | Wang et al. |
| 2003/0165733 A1 | 9/2003 | Takehara et al. |
| 2004/0072072 A1 | 4/2004 | Suzuki et al. |
| 2004/0151951 A1 | 8/2004 | Hyung et al. |
| 2004/0161669 A1 | 8/2004 | Zolotnik et al. |
| 2004/0191630 A1 | 9/2004 | Kawamura et al. |
| 2005/0008941 A1 | 1/2005 | Kim et al. |
| 2005/0019670 A1 | 1/2005 | Amine et al. |
| 2005/0026037 A1 | 2/2005 | Riley, Jr. et al. |
| 2005/0031942 A1 | 2/2005 | Hennige et al. |
| 2005/0042520 A1 | 2/2005 | Roh et al. |
| 2005/0202316 A1 | 9/2005 | Hwang et al. |
| 2005/0233207 A1 | 10/2005 | Kim |
| 2006/0051671 A1 | 3/2006 | Thackeray et al. |
| 2006/0051673 A1 | 3/2006 | Johnson et al. |
| 2006/0099472 A1 | 5/2006 | Hsu |
| 2006/0147809 A1 | 7/2006 | Amine et al. |
| 2006/0172201 A1 | 8/2006 | Yasukawa et al. |
| 2006/0194119 A1 | 8/2006 | Son et al. |
| 2006/0197496 A1 | 9/2006 | Iijima et al. |
| 2006/0257743 A1 | 11/2006 | Kuratomi et al. |
| 2006/0269834 A1 | 11/2006 | West et al. |
| 2006/0281012 A1 | 12/2006 | Ugawa et al. |
| 2006/0286459 A1 | 12/2006 | Zhao et al. |
| 2007/0148544 A1 | 6/2007 | Le |
| 2007/0178380 A1 | 8/2007 | Iwanaga et al. |
| 2008/0008933 A1 | 1/2008 | Lampe-Onnerud |
| 2008/0026297 A1 | 1/2008 | Chen et al. |
| 2008/0063945 A1 | 3/2008 | Ivanov et al. |
| 2008/0107968 A1 | 5/2008 | Patoux et al. |
| 2008/0131772 A1 | 6/2008 | Jambunathan et al. |
| 2008/0254353 A1 | 10/2008 | Takezawa |
| 2008/0254361 A1 | 10/2008 | Horikawa |
| 2008/0318122 A1 | 12/2008 | Sun |
| 2009/0092900 A1 | 4/2009 | Obana et al. |
| 2009/0104530 A1 | 4/2009 | Shizuka et al. |
| 2009/0111028 A1 | 4/2009 | Lee et al. |
| 2009/0142670 A1 | 6/2009 | Wang et al. |
| 2009/0253042 A1 | 10/2009 | Sun et al. |
| 2009/0253046 A1 | 10/2009 | Smart et al. |
| 2009/0263707 A1 | 10/2009 | Buckley et al. |
| 2009/0263721 A1 | 10/2009 | Haruna et al. |
| 2009/0305131 A1 | 12/2009 | Kumar et al. |
| 2010/0086853 A1 | 4/2010 | Venkatachalam et al. |
| 2010/0086854 A1 | 4/2010 | Kumar et al. |
| 2010/0119942 A1 | 5/2010 | Kumar |
| 2010/0151332 A1 | 6/2010 | Lopez et al. |
| 2010/0167121 A1 | 7/2010 | Arai et al. |
| 2011/0017528 A1 | 1/2011 | Kumar et al. |
| 2011/0052981 A1 | 3/2011 | Lopez et al. |
| 2011/0052989 A1 | 3/2011 | Venkatachalam et al. |
| 2011/0076556 A1 | 3/2011 | Karthikeyan et al. |
| 2011/0111294 A1 | 5/2011 | Lopez et al. |
| 2011/0111298 A1 | 5/2011 | Lopez et al. |
| 2011/0165474 A1 | 7/2011 | Im et al. |
| 2011/0236751 A1 | 9/2011 | Amiruddin et al. |
| 2011/0244331 A1 | 10/2011 | Karthikeyan et al. |
| 2012/0105007 A1 | 5/2012 | Amiruddin et al. |
| 2012/0107680 A1 | 5/2012 | Amiruddin et al. |

FOREIGN PATENT DOCUMENTS

| | | |
|---|---|---|
| JP | 09-045373 | 2/1997 |
| JP | 10-255837 | 9/1998 |
| JP | 2000-012018 | 1/2000 |
| JP | 2002-110167 | 4/2002 |
| JP | 2003-223887 | 8/2003 |
| JP | 2005-332707 | 12/2005 |
| JP | 2007-165111 A | 6/2007 |
| JP | 2007-220630 | 8/2007 |
| JP | 2007-250440 A | 9/2007 |
| JP | 2010-287512 A | 12/2010 |
| KR | 10-2001-0043360 | 2/2001 |
| KR | 10-2003-0007651 | 1/2003 |
| KR | 10-2005-0111764 | 11/2005 |
| KR | 10-0578877 | 5/2006 |
| KR | 10-0684724 | 2/2007 |
| KR | 10-2008-0082276 A | 9/2008 |
| WO | 01/35473 A1 | 5/2001 |
| WO | 01/91209 A1 | 11/2001 |
| WO | 03/021697 A2 | 3/2003 |
| WO | 2004/040687 A1 | 5/2004 |
| WO | 2004/084330 A2 | 9/2004 |
| WO | 2005/083829 A2 | 9/2005 |
| WO | 2006/109930 A1 | 10/2006 |
| WO | 2006/137673 A1 | 12/2006 |
| WO | 2008/079104 A1 | 7/2008 |
| WO | 2008/086041 A1 | 7/2008 |
| WO | 2009/022848 A1 | 2/2009 |

OTHER PUBLICATIONS

Ito et al., "The realtionship between crystal structure and the electrochemical reaction of Li-rich insertion materials (2)" 2010.

Kang et al., "Enchancing the rate capability of high capacity $xLi_2MnO_3 \cdot (1-x)LiMO_2$ (M=Mn, Ni, Co) electrodes by Li—Ni—PO4 treatment," Electrochemistry Communications 11 (2009) 748-751.

(56) References Cited

OTHER PUBLICATIONS

Kang et al., "Layered Li(Li0.2Ni0.15+0.5zCo0.10Mn0.55−0.5z)O2-zFz cathode materials for Li-ion secondary batteries," Journal of Power Sources 146 (2005) 654-657.

Kim et al., "Synthesis of spherical Li[Ni(1/3-z)Co(1/3-z)Mn(1/3-z)Mgz]O2 as positive electrode material for lithium ion battery," Electrchimica Acta 51 (2006) 2447-2453.

Kim et al., "Improvement of High-Voltage Cycling Behavior of Surface Modified Li[Ni1/3Co1/3Mn1/3]O2 Cathodes by Fluorine Substitution for Li-Ion Batteries," Journal of the Electrochemical Society 152 (9) A1701-A1713 (2005).

Lee et al., "High capacity Li[Li0.2Ni0.2Mn0.6]O2 cathode materials via a carbonate co-precipitation method," J. of Power Sources, 162 (2006), 1346-1350.

Luo et al., "On the incorporation of fluorine into the manganese spinel cathode lattice," Solid State Ionics 180 (2009) 703-707.

Ohsawa et al., "The relationship between crystal structure and the electrochemical reaction of Li-rich insertion materials (1)," 2010.

Schweiger et al., "Optimization of Cycling Behavior of Lithium Ion Cells at 60° C. bt Additives for Electrolytes Based on Lithium bis[1,2-oxalato(2-)-O,O'] borate," Int. J. Electrochem. Sci., 3 (2008) 427-443.

Sun et al., "AlF3-Coating to Improve High Voltage Cycling Performance of Li[Ni1/3Co1/3Mn1/3]O2 Cathode Materials for Lithium Secondary Batteries," J. of the Electrochemical Society, 154 (3), A168-A172 (2007).

Sun et al., "Significant Improvement of high voltage cycling behavior AlF3-coated LiCoO2 cathode," Electrochemistry Communications 8 (2006) 821-826.

Thackeray et al., "Comments on the structural complexity of lithium-rich Li1+xM1−xO2 electrodes (M=Mn,Ni,Co) for lithium batteries," Electrochemistry Communications 8 (2006), 1531-1538.

Woo et al., "Significant Improvement of Electrochemical Performance of AlF3-Coated Li[Ni0.8Co0.1Mn0.1]O2 Cathode Materials," J. of the Electrochemical Society, 154 (11) A1005-A1009 (2007).

Wu et al., "High Capacity, Surface-Modified Layered Li[Li(1-x)/3Mn(2-x)/3Nix/3Cox/3]O2 Cathodes with Low Irreversible Capacity Loss," Electrochemical and Solid State Letters, 9 (5) A221-A224 (2006).

Yabuuchi et al., "Study of LiMnO3—Li(Co1/3Ni1/3Mn1/3)O2 for High Capacity Positive Electrode Material: II. Redox Reaction at the Positive Electrode/Electrolyte Interface," 2010.

Yoshii et al., "Study of LiMnO3—Li(Co1/3Ni1/3Mn1/3)O2 for High Capacity Positive Electrode Material: I. Change in the Crystal and Electronic Structure upon Li de-intercalation," 2010.

"Tech Highlights: Chemical Analysis of Graphite/Electrolyte Interface in Lithium Bis(oxalato)borate-Based Electrolytes [From: Electrochem. Solid-State Lett., 6(7), A144 (2003)]" prepared by Venkat Srinivasan et al., The Electrochemical Society Interface Winter 2003, p. 30.

"Tech Highlights: Graphite Anode Stabilization in Propylene Carbonate by Lithium Bis(oxalate)borate [From: Electrochem. Solid-State Lett., 5, A259 (2002)]" prepared by Zenghe Liu et al., The Electrochemical Society Interface Spring 2003 p. 20.

Chen et al., "Develop & evaluate materials & additives that enhance thermal and overcharge abuse," presentation for Argonne National laboratory, May 19, 2009.

Zheng et al., "The Effects of AlF3 Coating on the Performance of Li[Li0.2Mn0.54Ni0.13Co0.13]O2 Positive Electrode Material for Lithium-Ion Battery," Journal of the Electrochemical Society, 155(10):A775-A782 (2008).

Zhang et al., "A review on electrolyte additives for lithium-ion batteries", Journal of Power Sources, 162 (2):1379-1394 (2006).

Supplementary European Search Report from corresponding European Patent Application No. 10834979.6, dated Sep. 26, 2013 (6 pages).

Chinese Office Action from corresponding Chinese Patent Application No. 201080060698.6, dated Apr. 24, 2014 (10 pages).

Office Action for corresponding Taiwan Patent Application No. 099142217, mailed May 9, 2013.

Achiha et al., "Electrochemical Behavior of Nonflammable Organo-Fluorine Compunds for Lithium Ion Batteries," Journal of the Electrochemical Society 156(6): A483-A488 (2009).

Choi et al., "Effect of fluoroethylene carbonate additive on interfacial properties of silicon thin-film electrode," Journal of Power Sources 161(2):1254-1259 (2006) (Abstract).

Ishikawa et al., "Li-ion Battery Performance with FSI-based Ionic Liquid Electrolyte and Fluorinated Solvent-based Electrolyte" ECS Trans. 33:29-36 (2010) (Abstract).

McMillan et al. "Fluoroethylene carbonate electrolyte and its use in lithium ion batteries with graphite anodes," Journal of Power Sources 81-2: 20-26 (1999) (Abstract).

Park et al., "Physical and electrochemical properties of spherical Li1+x(Ni1/3Co1/3Mn1/3)1-xO2 cathode materials", Journal of Power Sources, 177:177-183 (2008).

Plichta et al., "A low-temperature electrolyte for lithium and lithium-ion batteries," Journal of Power Sources 88: 192-196 (2000).

Profatilova et al., "Enhanced thermal properties of the solid electrolyte interphase formed on graphite in an electrolyte with fluoroethylene carbonate," Electrochimica Acta 54: 4445-4450 (2009).

Smart et al., "Performance of low temperature electrolytes in experimental and prototype Li-ion cells," 5th International Energy Conversion Engineering Conference, St. Louis, Missouri Jun. 25-27, 2007, published by NASA's Jet Propulsion Laboratory, Pasadena California, 2007 (http://hdl.handle.net/2014/41350).

Song et al., Two- and three-electrode impedance spectroscopy of lithium-ion batteries, Journal of Power Sources 111 (2002) 255-267.

Sun et al., "The preparation and electrochemical performance of solid solutions LiCoO2—Li2MnO3 as cathode materials for lithium ion batteries," J of Power Sources 159 (2006) 1353-1359.

Thackeray et al., "Li2MnO3-stabilized LiMO2 (M = Mn, Ni, Co) electrodes for lithium-ion batteries," J. Mater. Chem., 2007; 17:3112-3125.

Evonik SEPARION 2009, "Scientific breakthrough: SEPARION® opens up new markets for lithium ion batteries," http://corporate.evonik.de/en/company/news/lithium_ion_batteries/Pages/separion.aspx.

"Battery Test Manual for Plug-In Hybrid Elelctric Vehicles," prepared for the U.S. Department of Energy, Office of Energy Efficiency and Renewable Energy, Vehicle Technologies Program, 2008.

"Market Insight: Tasks of Korean rechargeable electrolyte industry," Solar & Energy Column published Dec. 27, 2010, http://www.solarnenergy.com/eng/info/show.php?c_id=4899 (viewed Jun. 23, 2011).

Product Brochure for FMC Lithium Lectro® Max 120 Anode Material, FMC Corporation, 2008.

Product Brochure for FMC Lithium Lectro® Max 130 Anode Material, FMC Corporation, 2008.

"Tech Briefs: Optimized Carbonate and Ester-Based Li-Ion Electrolytes," published by NASA's Jet Propulsion Laboratory, Pasadena, California (Apr. 1, 2008) (2 pages).

"Tech Briefs:Ester-Based Electrolytes for Low-Temperature Li-Ion Cells," published by NASA's Jet Propulsion Laboratory, Pasadena, California (Dec. 1, 2005) (1 page).

"Technical Support Package for Optimized Carbonate and Ester-Based Li-Ion Electrolytes," NASA Tech Briefs NPO-44974, published by NASA's Jet Propulsion Laboratory, Pasadena, California (37 pages).

Search Report and Written Opinion for International Patent Application No. PCT/US2010/058182, mailed Aug. 29, 2011.

* cited by examiner

LITHIUM ION BATTERY WITH HIGH VOLTAGE ELECTROLYTES AND ADDITIVES

FIELD OF THE INVENTION

The invention relates to lithium ion secondary batteries including cathode active materials that are capable of operation at high voltages with correspondingly appropriate electrolytes suitable for longer term cycling. The invention further relates to high voltage batteries with electrolytes comprising additives that further stabilize cycling of the batteries.

BACKGROUND OF THE INVENTION

Lithium batteries are widely used in consumer electronics due to their relatively high energy density. Rechargeable batteries are also referred to as secondary batteries, and lithium ion secondary batteries generally have a negative electrode material that intercalates lithium. For some current commercial batteries, the negative electrode material can be graphite, and the positive electrode material can comprise lithium cobalt oxide ($LiCoO_2$). In practice, for some materials only roughly 50% of the theoretical capacity of the cathode can be used, e.g., roughly 140 mAh/g. At least two other lithium-based cathode materials are also currently in commercial use. These two materials are $LiMn_2O_4$, having a spinel structure, and $LiFePO_4$, having an olivine structure. These other materials have not provided any significant improvements in energy density.

Lithium ion batteries are generally classified into two categories based on their application. The first category involves high power battery, whereby lithium ion battery cells are designed to deliver high current (Amperes) for such applications as power tools and Hybrid Electric Vehicles (HEVs). However, by design, these battery cells are lower in energy since a design providing for high current generally reduces total energy that can be delivered from the battery. The second design category involves high energy batteries, whereby lithium ion battery cells are designed to deliver low to moderate current (Amperes) for such applications as cellular phones, lap-top computers, Electric Vehicles (EVs) and Plug in Hybrid Electric Vehicles (PHEVs) with the delivery of higher total capacity. In general, it is desirable for the batteries to longer cycle lives so that the batteries can be recharged a larger number of times before replacement.

SUMMARY OF THE INVENTION

In a first aspect, the invention pertains to a high voltage lithium secondary battery comprising a positive electrode, a negative electrode and a separator between the negative electrode and the positive electrode. The positive electrode comprises a lithium intercalation compound, and the negative electrode comprises a lithium intercalation/alloying compound. In general, the battery is rated with a charging voltage of at least about 4.45 V. The electrolyte comprises $LiPF_6$ and/or $LiBF_4$, a solvent comprising ethylene carbonate and a liquid organic solvent, and an electrolyte stabilizing additive, and the positive electrode lithium intercalation composition comprises a composition represented approximately by the formula $Li_{1+a}Ni_\alpha Mn_\beta Co_\gamma A_\delta O_{2-z}F_z$, where a ranges from about 0.05 to about 0.3, α ranges from about 0.1 to about 0.4, β range from about 0.3 to about 0.65, γ ranges from 0 to about 0.4, δ ranges from about 0 to about 0.15, and z ranges from 0 to 0.2, and where A is Mg, Sr, Ba, Cd, Zn, Al, Ga, B, Zr, Ti, Ca, Ce, Y, Nb, Cr, Fe, V, Li or combinations thereof. In some embodiments, the electrolyte stabilizing additive comprises a lithium salt additive in a concentration of from about 0.0005 weight percent to about 6 weight percent, a non-ionic organic additive in a concentration from about 0.0005 weight percent to about 15.0 weight percent or a combination thereof.

In a further aspect, the invention pertains to a high voltage lithium secondary battery comprising a positive electrode, a negative electrode, an electrolyte and a separator between the negative electrode and the positive electrode, in which the negative electrode comprises a lithium intercalation/alloying compound and the positive electrode comprises a lithium intercalation compound. The electrolyte can comprise a primary lithium electrolyte salt, a solvent comprising ethylene carbonate and a liquid organic solvent selected from the group consisting of dimethyl carbonate, methyl ethyl carbonate, γ-butyrolactone, γ-valerolactone or a combination thereof, and a lithium salt electrolyte stabilizing additive in a concentration from about 0.01 weight percent to about 1.5 weight percent.

In another aspect, the invention pertains to a method for producing a lithium secondary battery rated to operate at a voltage above 4.45 volts, in which the method comprises adding a particularly desirable electrolyte to an electrode assembly that comprises a positive electrode, a negative electrode and a separator between the negative electrode and the positive electrode. The positive electrode comprises a lithium intercalation compound and the negative electrode comprises a lithium intercalation/alloying compound. In some embodiments, the electrolyte comprises $LiPF_6$ and/or $LiBF_4$, ethylene carbonate, a room temperature liquid solvent selected from the group consisting of dimethyl carbonate, methyl ethyl carbonate, γ-butyrolactone, γ-valerolactone or a combination thereof, and a lithium salt electrolyte stabilizing additive in a concentration from about 0.01 weight percent to about 1.5 weight percent.

DETAILED DESCRIPTION OF THE INVENTION

Figure 1:
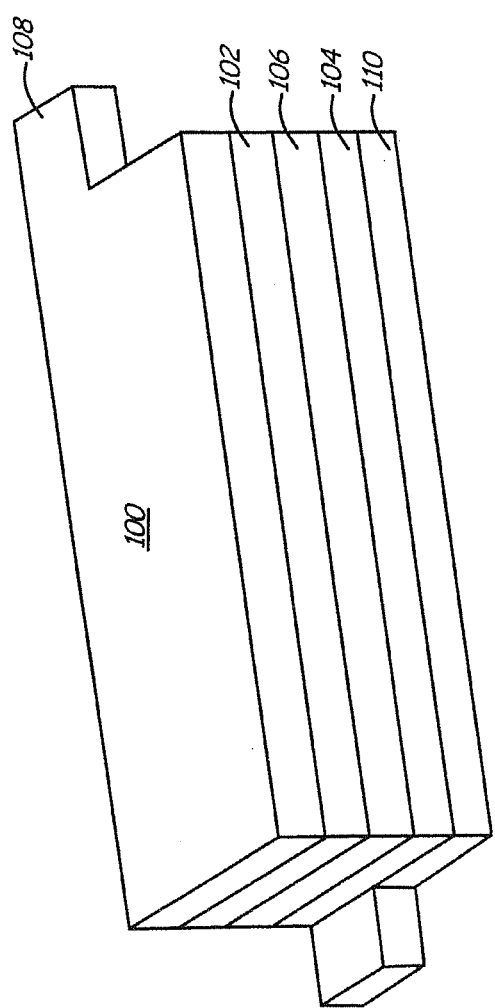
FIG. 1 is a schematic perspective view of an electrode stack useful for the formation of a battery.

Stable electrolytes are described for use in high voltage lithium ion batteries to improve the cycling performance of these batteries. It can be desirable to operate batteries at high voltages to provide for higher capacity and/or to provide greater power output. However, lithium ion batteries operating at higher voltages tend to exhibit a decreased cycle life. With improved electrolytes described herein, the cycling properties of the high voltage batteries can be significantly improved. In particular, the electrolyte can be selected such that the composition does not oxidize at the operational voltages of the battery. In some embodiments, the positive electrode active material is a lithium rich layered metal oxide composition. While batteries formed with these positive electrode active compositions have demonstrated long cycling stability at lower charge voltages, it is desirable to cycle the batteries at higher charge voltages to achieve greater capacity performance. The desired electrolytes generally comprise ethylene carbonate and a liquid solvent along with a stabilizing additive. Some stabilizing additives are lithium salts, and other desirable stabilizing additives are organic compositions.

The batteries described herein are lithium ion batteries in which a non-aqueous electrolyte comprises lithium ions. For secondary lithium ion batteries, lithium ions are released from the negative electrode during discharge such that the negative electrode functions as an anode during discharge with the generation of electrons from the oxidation of lithium upon its release from the electrode. Correspondingly, the positive electrode takes up lithium ions through intercalation or a similar process during discharge such that the positive electrode functions as a cathode which consumes electrons during discharge. Upon recharging of the secondary battery, the flow of lithium ions is reversed through the battery with the negative electrode taking up lithium and with the positive electrode releasing lithium as lithium ions.

We refer to solutions comprising solvated ions as electrolytes, and ionic compositions that dissolve to form solvated ions in appropriate liquids are referred to as electrolyte salts. Electrolytes for lithium ion batteries can comprise one or more selected lithium salts. The particular electrolyte salt(s) and their concentration in the electrolyte can influence the oxidative stability of the resulting electrolyte. Desired compositions of the electrolyte are discussed in detail in the following.

The word "element" is used herein in its conventional way as referring to a member of the periodic table in which the element has the appropriate oxidation state if the element is in a composition and in which the element is in its elemental form, $M^0$, only when stated to be in an elemental form. Therefore, a metal element generally is only in a metallic state in its elemental form or a corresponding alloy of the metal's elemental form. In other words, a metal oxide or other metal composition, other than metal alloys, generally is not metallic.

In some embodiments, the lithium ion batteries can use a positive electrode active material that is lithium rich relative to a reference homogenous electroactive lithium metal oxide composition. While not wanted to be limited by theory, it is believed that appropriately formed lithium-rich lithium metal oxides have a composite crystal structure. For example, in some embodiments of lithium rich materials, a $Li_2MnO_3$ composition may be structurally integrated with a layered $LiMnO_2$ component, or similar composite compositions comprise similar layered crystalline structure with a portion of the manganese cations substituted with other transition metal cations with appropriate oxidation states. In some embodiments, the positive electrode material can be represented in two component notation as $x\ Li_2M'O_3 \cdot (1-x) LiM''O_2$ where M'' is one or more metal cations with an average valance of +3 with at least one cation being $Mn^{+3}$ or $Ni^{+3}$ and where M' is one or more metal cations with an average valance of +4. These compositions are described further, for example, in U.S. Pat. No. 6,680,143 to Thackeray et al., entitled "Lithium Metal Oxide Electrodes for Lithium Cells and Batteries," incorporated herein by reference. Positive electrode active materials of particular interest can be represented by a formula $Li_{1+a}Ni_\alpha Mn_\beta Co_\gamma A_\delta O_{2-z}F_z$, where a ranges from about 0.05 to about 0.3, $\alpha$ ranges from about 0.1 to about 0.4, $\beta$ range from about 0.3 to about 0.65, $\gamma$ ranges from 0 to about 0.4, $\delta$ ranges from about 0 to about 0.15 and z ranges from 0 to about 0.2, and where A is Mg, Sr, Ba, Cd, Zn, Al, Ga, B, Zr, Ti, Ca, Ce, Y, Nb, Cr, Fe, V, Li or combinations thereof. If $a+\alpha+\beta+\gamma+\delta=1$, then $Li_{1+x}Ni_\alpha Mn_\beta Co_\gamma A_\delta O_2$ can be rewritten as $2a/(1-a) Li_2M'O_3 \cdot ((1-3a)/(1-a)) LiMO_2$, where M' and M are appropriate combinations of Ni, Mn, Co and A to achieve the desired oxidation states of each component, and F is an optional anion dopant.

A carbonate co-precipitation process has been performed for the desired lithium rich metal oxide materials described herein and exhibiting the high specific capacity performance. In addition to the high specific activity, the materials can exhibit superior tap density which leads to high overall capacity of the material in fixed volume applications. The lithium rich compositions have the capability of operating at high voltages, for example, against lithium or elemental carbon negative electrode active materials. The improved electrolytes described herein can be effective to improve the cycling performance of the lithium rich layered compositions in operation at high charge voltages above 4.45 volts.

Negative electrode active materials are used in the counter-electrode for the positive electrodes. The compositions of the positive electrode active material and the negative electrode active material determine the potential of the battery during discharge, which is the difference between the potentials of the respective half reactions. While lithium metal can generally support cycling of a battery, general belief is that lithium metal is not suitable for longer battery cycling. Therefore, lithium secondary batteries generally incorporate a material which can incorporate lithium ions from the cathode through intercalation, alloying or the like. In particular, elemental carbon has been found to support high voltages with reasonable capacities and with good cycling properties.

As a result of irreversible changes to the battery, the capacity of the secondary batteries is observed to decrease with longer term cycling to varying degrees. The degradation of the battery performance with cycling can depend on the composition in the battery as well as the parameters of the charging and discharging process itself. Thus, after a number of cycles, the performance of the battery falls below acceptable values, and the battery is replaced. It is desirable to increase the number of cycles generally available from the batteries prior to the capacity dropping below acceptable performance prompting replacement.

Potential contributions to the loss of battery capacity with the cycling of the battery include, for example, decomposition of the electrolyte and irreversible changes to the active materials. When the corresponding batteries with the electrode active materials are in use, the uptake and release of lithium ions from the lattice induces changes in the crystalline lattice of the electroactive material. As long as these changes are essentially reversible, the capacity of the material does not change with cycling of the batteries. Several different parameters related to the battery can be adjusted to improve the cycling performance of high voltage secondary batteries. For example, the selection of the active materials influences the cycling properties of the batteries. The lithium rich metal oxide compositions described herein can be used for the positive electrode active materials, and elemental carbon, e.g., graphitic carbon, can be used for the negative electrode active materials. It has been found that the use of inert inorganic coatings on the positive electrode active materials can improve the cycling stability of the battery, as described further below.

Irreversible changes to the electrolyte can also result in degradation of the battery performance with cycling of the battery. Appropriate selection of the electrolyte with respect to solvent and to the lithium salt can improve the cycling performance of the high voltage batteries, as shown in the Examples below. Furthermore, additives can be provided to stabilize the battery over cycling. In some embodiments, the additives are present in an amount of no more than about 5 weight percent. Additives generally can be classified either as lithium salts or as organic additives, although the lithium salts can have an organic anion. While the lithium salt additives also contribute lithium ions to the electrolyte solution, another lithium salt is generally present that supplies a majority of the lithium ions to provide ionic conductivity. Surprising results are presented below in which lower amounts of a lithium salt additive provides better performance relative to greater additive concentrations.

Also, on the first cycle of the battery, generally there is an irreversible capacity loss that is significantly greater than per cycle capacity loss at subsequent cycles. The irreversible capacity loss is the difference between the first charge capacity of the new battery and the first discharge capacity. Both the discharge and the charge capacities are referenced to the rated charge potential of the battery. To compensate for this first cycle irreversible capacity loss, extra electroactive material can be included in the negative electrode such that the battery can be fully charged even though this lost capacity is not accessible during most of the life of the battery. Extra negative electrode material that does not contribute to battery cycling is essentially wasted. A significant portion of the first cycle irreversible capacity loss can be generally attributed to the positive electrode active material. Furthermore, some of the irreversible capacity loss can be generally attributed to the formation of a solvent electrolyte interphase layer associated with the negative electrode material, as described further below.

The electrolyte generally comprises a non-aqueous solvent, a lithium salt and a stabilizing additive. The non-aqueous solvent generally comprises two or more components. A first component can be selected, for example, to provide desired levels of solubility of the lithium salts, and these first components can be solids at room temperature. The solid solvent components generally can be more polar, which provides the desired solubility of lithium salts. For high voltage batteries, ethylene carbonate can be used as a first solvent component with desired properties.

A second solvent component generally is a liquid at room temperature and provides increased ion mobility. The solvent can comprise a plurality of room temperature liquid components. The solvent components generally are miscible. The liquid components to the solvent can introduce risks of leakage and evaporation. The relative amounts of the solvent components can be selected to balance the various properties introduced by the particular solvent components. Generally, the solvent blend is a viscous liquid at room temperature. If the battery is expected to operate over a particular range of temperatures, the solvent selection generally also can be based on appropriate properties over the desired operating temperature range such that appropriate ionic conductivity is maintained over the temperature range. The solvents have also been implicated in the formation of solvent electrolyte interphase (SEI) layer, which forms on the first charge of the battery and can contribute to the cycling stability of the battery through the decrease of subsequent reaction, e.g., oxidation of the electrolyte with the active material. In particular, ethylene carbonate has been associated with relatively stabile SEI layer formation.

The lithium salt provides the lithium ions that are active at both of the battery electrodes of a secondary battery. The lithium salt dissolves into the non-aqueous solvents. The selection of the particular salt can be based on appropriate solubility, ion mobility and stability. Various lithium salts have been used and/or proposed that generally have halogen atoms within the anion. The selection of salts can be influenced by the stability of the resulting electrolyte.

For high voltage operation, another significant aspect of the electrolyte properties is the oxidative stability. The oxidative stability can depend on both the solvent and the lithium salt. Suitable combinations of solvent and lithium salts can be used for high voltage operation, i.e., voltages above 4.45 volts. The improved oxidative stability is shown to improve cycling performance of the corresponding batteries.

Additives have been found that improve the cycling performance of the high voltage batteries. In general, the function of the additives may or may not be well understood. In some embodiments, the additives may be effective to prevent side reactions that result in undesired irreversible changes to the battery materials. For example, undesirable reaction can involve the solvent electrolyte or the active materials in the electrode. Through the decrease in the irreversible side reactions, the cycling performance of the battery can be correspondingly improved.

In general, the additives can be classified as lithium salt additives and organic non-ionic additives. In some embodiments, the lithium salt additives can be used as the lithium ion salt, but generally the beneficial effects can be obtained from an additive amount of the composition. For lithium salt additives, the electrolyte generally comprises no more than about 6 weight percent of a lithium salt additive. For a non-ionic organic additive, an electrolyte generally comprises no more than 15 weight percent of an additive. In particular, it has been found that in some embodiments, a lithium salt additive can be more effective in lower concentrations such that additional amounts of the additive result in fast fading of capacity with cycling. It may be desirable to include a plurality of additives, such as a lithium salt additive and an organic non-ionic additive.

The formation of a lithium secondary battery refers to the first charge of the battery. During the first charge of the battery, lithium leaves the active material positive electrode and is incorporated into the active material of the negative electrode. Furthermore, irreversible changes to the battery evidently take place. One change to the battery materials is believed to involve the formation of the solvent electrolyte interphase layer in association with the negative electrode active material. Other irreversible changes may take place.

The first charge capacity generally is significantly different from the first discharge capacity of the battery, and this difference is referred to as the irreversible capacity loss. Unless specifically indicated otherwise, the phrase "irreversible capacity loss" refers to the capacity difference between the first charge and the first discharge of the battery.

As described herein, the lithium rich positive electrode active materials with the composite crystal structure can exhibit high specific capacity above room temperature with good cycling properties for discharge from 4.5 volts. In general, the capacity of a cell during discharge depends on the rate of discharge. The maximum capacity of a specific cell is measured at very slow discharge rates. In actual use, the actual capacity is less than the maximum due to discharge at a finite rate. More realistic capacities can be measured using reasonable rates of discharge that are more similar to the rates during use. For low to moderate rate applications, a reasonable testing rate involves a discharge of the cell over three hours. In conventional notation this is written as C/3 or 0.33 C. The positive electrode active materials described herein can have a specific discharge capacity of at least about 175 mAh/g at a discharge rate of C/3 at the 120th discharge cycle at room temperature when discharged from 4.5 volts to 2.0 volts. Also, in some embodiments, the positive electrode active material can have a specific capacity after 120 cycles that is at least about 85% of the specific capacity at 5 cycles with a discharge rate of C/3 discharged between 4.5 volts and 2.0 volts. A person of ordinary skill in the art will recognize that additional ranges of specific discharge capacity within this explicit range are contemplated and are within the present disclosure.

In some embodiments, it is strongly desired for the batteries to have a long cycle life where the end of life is indicated by the particular drop in capacity below a selected threshold. For consumer electronics, some products have a desired cycle life of at least 300 cycles with acceptable capacity. For electric power vehicles, hybrids and the like, the batteries represent a large cost for the vehicle, and a long cycle life, e.g., at least a thousand cycles, can be desired for the vehicle to be commercially desirable. Improvements described herein can improve the cycling performance of high voltage batteries so that their improved capacity can be exploited for a range of applications.

Battery Structure

Referring to FIG. 1, a battery 100 is shown schematically having a negative electrode 102, a positive electrode 104 and a separator 106 between negative electrode 102 and positive electrode 104. A battery can comprise multiple positive electrodes and multiple negative electrodes, such as in a stack, with appropriately placed separators. Electrolyte in contact with the electrodes provides ionic conductivity through the separator between electrodes of opposite polarity. A battery generally comprises current collectors 108, 110 associated respectively with negative electrode 102 and positive electrode 104. The stack of electrodes with their associated current collectors and separator are generally placed within a container with the electrolyte. Electrolytes are described in detail in a subsequent section.

Lithium has been used in both primary and secondary batteries. An attractive feature of lithium metal is its light weight and the fact that it is the most electropositive metal, and aspects of these features can be advantageously captured in lithium ion batteries also. Certain forms of metals, metal oxides, and carbon materials are known to incorporate lithium ions into its structure through intercalation, alloying or similar mechanisms. Desirable mixed metal oxides are described further herein to function as electroactive materials for positive electrodes in secondary lithium ion batteries. Lithium ion batteries refer to batteries in which the negative electrode active material is also a lithium intercalation/alloying material. If lithium metal itself is used as the anode, the resulting battery generally is referred to as a lithium battery.

The nature of the negative electrode intercalation material influences the resulting voltage of the battery since the voltage is the difference between the half cell potentials at the cathode and anode. Suitable negative electrode lithium intercalation compositions can include, for example, graphite, synthetic graphite, coke, fullerenes, niobium pentoxide, tin alloys, silicon, titanium oxide, tin oxide, and lithium titanium oxide, such as $Li_xTiO_2$, $0.5<x\leq1$ or $Li_{1+x}Ti_{2+x}O_4$, $0\leq x<1/3$. Additional negative electrode materials are described in copending U.S. patent applications Ser. No. 12/502,609, now published patent application 2010/0119942 to Kumar, entitled "Composite Compositions, Negative Electrodes with Composite Compositions and Corresponding Batteries," and Ser. No. 12/429,438, now U.S. Pat. No. 8,277,974 to Kumar et al., entitled "Lithium Ion Batteries with Particular Negative Electrode Compositions," both of which are incorporated herein by reference.

However, the negative electrodes can generally comprise elemental carbon materials, e.g., graphite, synthetic graphite, coke, fullerenes, carbon nanotubes, other graphitic carbon and combinations thereof, which are expected to be able to achieve the long term cycling at higher voltages. Thus, for the long cycling, high energy density batteries of particular interest, the negative electrodes generally comprise an active elemental carbon material. Graphitic carbon generally comprises graphene sheets of $sp^2$ bonded carbon atoms. For convenience, as used herein graphitic carbon refers to any elemental carbon material comprising substantial domains of graphene sheets.

The positive electrode active compositions and negative electrode active compositions generally are powder compositions that are held together in the respective electrode with a polymer binder. The binder provides ionic conductivity to the active particles when in contact with the electrolyte. Suitable polymer binders include, for example, polyvinylidine fluoride, polyethylene oxide, polyethylene, polypropylene, polytetrafluoroethylene, polyacrylates, rubbers, e.g. ethylene-propylene-diene monomer (EPDM) rubber or styrene butadiene rubber (SBR), copolymers thereof, or mixtures thereof.

The active particle loading in the binder can be large, such as greater than about 80 weight percent, in further embodiments at least about 83 weight percent and in other embodiments form about 85 to about 97 weight percent active material. A person of ordinary skill in the art will recognize that additional ranges of particles loadings within the explicit ranges about are contemplated and are within the present disclosure. To form the electrode, the powders can be blended with the polymer in a suitable liquid, such as a solvent for the polymer. The resulting paste can be pressed into the electrode structure.

The positive electrode composition, and in some embodiments the negative electrode composition, generally can also comprise an electrically conductive powder distinct from the electroactive composition. Suitable supplemental electrically conductive powders include, for example, graphite, carbon black, metal powders, such as silver powders, metal fibers, such as stainless steel fibers, and the like, and combinations thereof. Generally, a positive electrode can comprise from about 1 weight percent to about 25 weight percent, and in further embodiments from about 2 weight percent to about 20 weight percent and in other embodiments from about 3 weight percent to about 15 weight percent distinct electrically conductive powder. A person of ordinary skill in the art will recognize that additional ranges of amounts of electrically conductive powders within the explicit ranges above are contemplated and are within the present disclosure.

Each electrode generally is associated with an electrically conductive current collector to facilitate the flow of electrons between the electrode and an exterior circuit. A current collector can comprise a metal structure, such as a metal foil or a metal grid. In some embodiments, a current collector can be formed from nickel, aluminum, stainless steel, copper or the like. An electrode material can be cast as a thin film onto a current collector. The electrode material with the current collector can then be dried, for example in an oven, to remove solvent from the electrode. In some embodiments, a dried electrode material in contact with a current collector foil or other structure can be subjected to a pressure from about 2 to about 10 kg/cm$^2$ (kilograms per square centimeter).

The separator is located between the positive electrode and the negative electrode. The separator is electrically insulating while providing for at least selected ion conduction between the two electrodes. A variety of materials can be used as separators. Commercial separator materials are generally formed from polymers, such as polyethylene and/or polypropylene that are porous sheets that provide for ionic conduction. Commercial polymer separators include, for example, the Celgard® line of separator material from Hoechst Celanese, Charlotte, N.C. Suitable separator materials include, for example, 12 micron to 40 micron thick trilayer polypropylene-polyethylene-polypropylene sheets, such as Celgard® M824, which has a thickness of 12 microns. Also, ceramic-polymer composite materials have been developed for separator applications. These composite separators can be stable at higher temperatures, and the composite materials can significantly reduce the fire risk. The polymer-ceramic composites for separator materials are described further in U.S. patent application 2005/0031942A to Hennige et al., entitled "Electric Separator, Method for Producing the Same and the Use Thereof," incorporated herein by reference. Polymer-ceramic composites for lithium ion battery separators are sold under the trademark Separion® by Evonik Industries, Germany.

The electrodes described herein can be incorporated into various commercial battery designs. For example, the cathode compositions can be used for prismatic shaped batteries, wound cylindrical batteries, coin cell batteries or other reasonable battery shapes. The testing in the Examples below was performed using coin cell batteries. The batteries can comprise a single cathode structure or a plurality of cathode structures assembled in parallel and/or series electrical connection(s). While the positive electrode active materials can be used in batteries for primary, or single charge use, the resulting batteries generally have desirable cycling properties for secondary battery use over multiple cycling of the batteries.

In some embodiments, the positive electrode and negative electrode can be stacked with the separator between them, and the resulting stacked structure can be rolled into a cylindrical or prismatic configuration to form the battery structure. Appropriate electrically conductive tabs can be welded or the like to the current collectors, and the resulting jellyroll structure can be placed into a metal canister or polymer package, with the negative tab and positive tab welded to appropriate external contacts. Electrolyte is added to the canister, and the canister is sealed to complete the battery. Some presently used rechargeable commercial batteries include, for example, the cylindrical 18650 batteries (18 mm in diameter and 65 mm long) and 26700 batteries (26 mm in diameter and 70 mm long), although other battery sizes can be used, as well as prismatic cells and foil pouch batteries of selected sizes.

Positive Electrode Active Materials

The positive electrode active materials comprise lithium intercalating metal oxide compositions. In some embodiments, the lithium metal oxide compositions can comprise lithium rich compositions that generally are believed to form a layered composite structure. The positive electrode active compositions can exhibit surprisingly high specific capacities and high tap densities in lithium ion battery cells under realistic discharge conditions. The desired electrode active materials can be synthesized using synthesis approaches described herein.

In some compositions of particular interest, the compositions can be described by the formula $Li_{1+a}Ni_\alpha Mn_\beta Co_\gamma A_\delta O_{2-z} F_z$, where a ranges from about 0.05 to about 0.3, $\alpha$ ranges from about 0.1 to about 0.4, $\beta$ range from about 0.3 to about 0.65, $\gamma$ ranges from 0 to about 0.4, $\delta$ ranges from about 0 to about 0.15 and z ranges from about 0 to about 0.2, and where A is Mg, Sr, Ba, Cd, Zn, Al, Ga, B, Zr, Ti, Ca, Ce, Y, Nb, Cr, Fe, V, Li or combinations thereof. A person of ordinary skill in the art will recognize that additional ranges of parameter values within the explicit ranges above are contemplated and are within the present disclosure. The fluorine is a dopant that can contribute to cycling stability as well as improved safety of the materials. In embodiments in which z=0, this formula reduces to $Li_{1+a}Ni_\alpha Mn_\beta Co_\gamma A_\delta O_2$. It has been found that suitable coatings provide desirable improvements in cycling properties without the use of a fluorine dopant, although it may be desirable to have a fluorine dopant in some embodiments. Coatings are discussed further below. Furthermore, in some embodiments it is desirable to have $\delta$=0. For these embodiments, if z=0 also, the formula simplifies to $Li_{1+a}Ni_\alpha Mn_\beta Co_\gamma O_2$, with the parameters outlined above.

With respect to some embodiments of materials described herein, Thackery and coworkers have proposed a composite crystal structure for some lithium rich metal oxide compositions in which a $Li_2M'O_3$ composition is structurally integrated into a layered structure with a $LiMO_2$ component. The electrode materials can be represented in two component notation as x $Li_2M'O_3$ (1−x) $LiMO_2$, where M is one or more metal elements with an average valance of +3 and with at least one element being Mn or Ni and M' represents one or more metal elements with an average valance of +4 and 0<x<1. In some embodiments, 0.01≤x≤0.8, and in further embodiments, 0.1≤x≤0.7. For example, M can be a combination of $Ni^{+2}$, $Co^{+3}$ and $Mn^{+4}$. The overall formula for these composite compositions can be written as $Li_{1+x/(2+x)}M'_{2x/(2+x)}M_{1-3x/(2+x)}O_2$, which can correspond with the formula in the previous paragraph if a+α+β+γ+δ=1 with a=x/(2+x). Batteries formed from these materials have been observed to cycle at higher voltages and with higher capacities relative to batteries formed with corresponding $LiMO_2$ compositions. These materials are described further in U.S. Pat. No. 6,680,143 to Thackery et al., entitled Lithium Metal Oxide Electrodes for Lithium Cells and Batteries," and U.S. Pat. No. 6,677,082 to Thackery et al., entitled "Lithium Metal Oxide Electrodes for Lithium Cells and Batteries," both of which are incorporated herein by reference. Thackery identified Mn, Ti and Zr as being of particular interest as M' and Mn and Ni for M.

The structure of some specific layered structures is described further in Thackery et al., "Comments on the structural complexity of lithium-rich $Li_{1+x}M_{1-x}O_2$ electrodes (M=Mn,Ni,Co) for lithium batteries," Electrochemistry Communications 8 (2006), 1531-1538, incorporated herein by reference. The study reported in this article reviewed compositions with the formulas $Li_{1+x}[Mn_{0.5}Ni_{0.5}]_{1-x}O_2$ and $Li_{1+x}[Mn_{0.333}Ni_{0.333}Co_{0.333}]_{1-x}O_2$. The article also describes the structural complexity of the layered materials. The examples below are based on the performance of a material with the composition Li $[Li_{0.2}Mn_{0.525}Ni_{0.175}Co_{0.1}]O_2$. These materials can be synthesized as described below, and in some embodiments, modified with a coating. The synthesis approaches along with the coating provide for superior performance of the materials with respect to capacity as well as cycling properties. The desirable properties of the active material along with the use of desirable electrolytes provide for the improved battery performance described herein.

Synthesis approaches described herein can be used to form layered lithium rich cathode active materials with improved specific capacity upon cycling and a high tap density. The synthesis methods have been adapted for the synthesis of compositions with the formula $Li_{1+a}Ni_{\alpha}Mn_{\beta}Co_{\gamma}A_{\delta}O_{2-z}F_z$, as described in detail above. The synthesis approaches are also suitable for commercial scale up. Specifically, co-precipitation process can be used to synthesize the desired lithium rich positive electrode materials with desirable results. In particular, a hydroxide co-precipitation approach as well as a carbonate co-precipitation approach has yielded active materials with very desirable properties.

In the co-precipitation process, metal salts are dissolved into an aqueous solvent, such as purified water, with a desired molar ratio. Suitable metal salts include, for example, metal acetates, metal sulfates, metal nitrates, and combination thereof. The concentration of the solution is generally selected between 1M and 3M. The relative molar quantities of metal salts can be selected based on the desired formula for the product materials. The pH of the solution can then be adjusted, such as with the addition of $Na_2CO_3$ and/or other soluble carbonate salt, and optionally ammonium hydroxide, to precipitate a metal carbonate or metal hydroxide precursor composition with the desired amounts of metal elements. Generally, the pH can be adjusted to a value between about 6.0 to about 12.0. The solution can be heated and stirred to facilitate the precipitation of the precursor composition. The precipitated precursor composition can then be separated from the solution, washed and dried to form a powder prior to further processing. For example, drying can be performed in an oven at about 110° C. for about 4 to about 12 hours. A person of ordinary skill in the art will recognize that additional ranges of process parameters within the explicit ranges above are contemplated and are within the present disclosure.

The collected metal carbonate or metal hydroxide powder can then be subjected to a heat treatment to convert the precursor composition to the corresponding oxide composition. Generally, the heat treatment can be performed in an oven, furnace or the like. The heat treatment can be performed in an inert atmosphere or an atmosphere with oxygen present. In some embodiments, the material can be heated to a temperature of at least about 350° C. and in some embodiments from about 400° C. to about 800° C. to convert the carbonate or hydroxide precursor composition to an oxide. The heat treatment generally can be performed for at least about 15 minutes, in further embodiments from about 30 minutes to 24 hours or longer, and in additional embodiments from about 45 minutes to about 15 hours. A further heat treatment can be performed to improve the crystallinity of the product material. This calcination step for forming the crystalline product generally is performed at temperatures of at least about 650° C., and in some embodiments from about 700° C. to about 1200° C., and in further embodiments from about 700° C. to about 1100° C. The calcination step to improve the structural properties of the powder generally can be performed for at least about 15 minutes, in further embodiments from about 20 minutes to about 30 hours or longer, and in other embodiments from about 1 hour to about 36 hours. The heating steps can be combined, if desired, with appropriate ramping of the temperature to yield desired materials. A person of ordinary skill in the art will recognize that additional ranges of temperatures and times within the explicit ranges above are contemplated and are within the present disclosure.

The lithium element can be incorporated into the material at one or more selected steps in the process. For example, a lithium salt can be incorporated into the solution prior to or upon performing the precipitation step through the addition of a hydrated lithium salt. In this approach, the lithium species is incorporated into the precursor composition in the same way as the other metals. Also, due to the properties of lithium, the lithium element can be incorporated into the material in a solid state reaction without adversely affecting the resulting properties of the product composition. Thus, for example, an appropriate amount of lithium source generally as a powder, such as $LiOH.H_2O$, $LiOH$, $Li_2CO_3$, or a combination thereof, can be mixed with the precipitated precursor composition. The powder mixture is then advanced through the heating step(s) to form the oxide and then the crystalline final product lithium metal oxide material.

The carbonate co-precipitation process for lithium rich lithium metal oxides is described further in copending U.S. patent application Ser. No. 12/332,735, now U.S. Pat. No. 8,465,873 to Lopez et al., entitled "Positive Electrode Materials for High Discharge Capacity Lithium Ion Batteries," incorporated herein by reference. A hydroxide co-precipitation process for lithium rich lithium metal oxides is described further in U.S. patent application Ser. No. 12/246,814, now U.S. Pat. No. 8,389,160 to Venkatachalam et al., entitled "Positive Electrode Materials for Lithium Ion Batteries Having a High Specific Discharge Capacity and Processes for the Synthesis of These Materials," incorporated herein by reference.

The use of LiF to introduce the fluorine dopant during the oxidation steps has been described in U.S. Pat. No. 7,205,072, to Kang et al. (the '072 patent), entitled "Layered cathode materials for lithium ion rechargeable batteries," incorporated herein by reference. It has been proposed that fluorine dopant incorporation is reduced or eliminated in higher temperature processing due to volatility of LiF at high reaction temperatures. See Luo et al., "On the incorporation of fluorine into the manganese spinel cathode lattice," Solid State Ionics 180 (2009) 703-707. However, it would seem that reasonable adjustment of the reaction conditions should provide for some fluorine doping through the high temperature process. The use of a fluorine dopant in lithium rich metal oxides to achieve improved performance is described in copending U.S. patent application Ser. No. 12/569,606, now U.S. Pat No. 8,916,294 to Kumar et al., entitled "Fluorine Doped Lithium Rich Metal Oxide Positive Electrode Battery Materials With High Specific Capacity and Corresponding Batteries," incorporated herein by reference. Thus, fluorine dopants may provide additional benefits for compositions doped with +2 metal ions. In general, fluorine dopants can be introduced using, for example, LiF and/or $MgF_2$ during an oxide formation step or, for example, reacting $NH_4HF_2$ with the already formed oxide at a temperature on the order of 450° C.

Coatings and Methods for Forming the Coatings

Inert inorganic coatings, such as metal fluoride coatings, have been found to significantly improve the performance of the lithium rich layered positive electrode active materials described herein. In particular, the cycling properties of the batteries formed from the metal fluoride coated lithium metal oxide have been found to significantly improve from the uncoated material, although inert metal oxide coatings have also been found to yield desirable properties. Additionally, the overall capacity of the batteries also shows desirable properties with the fluoride coating, and the irreversible capacity loss of the first cycle of the battery is reduced. As discussed earlier, first cycle irreversible capacity loss of a battery is the difference between the charge capacity of the new battery and its first discharge capacity. When the coating for the positive electrode active material is appropriately selected, these advantageous properties from the coating are maintained for the doped compositions.

The coating provides an improvement in the performance of the high capacity lithium rich compositions described herein. In general, a selected metal fluoride or metalloid fluoride can be used for the coating. Similarly, a coating with a combination of metal and/or metalloid elements can be used. Metal/metalloid fluoride coatings have been proposed to stabilize the performance of positive electrode active materials for lithium secondary batteries. Suitable metals and metalloid elements for the fluoride coatings include, for example, Al, Bi, Ga, Ge, In, Mg, Pb, Si, Sn, Ti, Tl, Zn, Zr and combinations thereof. Aluminum fluoride can be a desirable coating material since it has a reasonable cost and is considered environmentally benign. Metal fluoride coatings are described generally in published PCT application WO 2006/109930A to Sun et al., entitled "Cathode Active Materials Coated with Fluorine Compound for Lithium Secondary Batteries and Method for Preparing the Same," incorporated herein by reference. This patent application provides results for $LiCoO_2$ coated with LiF, $ZnF_2$ or $AlF_3$. The Sun PCT application referenced above specifically refers to the following fluoride compositions, CsF, KF, LiF, NaF, RbF, TiF, AgF, $AgF_2$, $BaF_2$, $CaF_2$, $CuF_2$, $CdF_2$, $FeF_2$, $HgF_2$, $Hg_2F_2$, $MnF_2$, $MgF_2$, $NiF_2$, $PbF_2$, $SnF_2$, $SrF_2$, $XeF_2$, $ZnF_2$, $AlF_3$, $BF_3$, $BiF_3$, $CeF_3$, $CrF_3$, $DyF_3$, $EuF_3$, $GaF_3$, $GdF_3$, $FeF_3$, $HoF_3$, $InF_3$, $LaF_3$, $LuF_3$, $MnF_3$, $NdF_3$, $VOF_3$, $PrF_3$, $SbF_3$, $ScF_3$, $SmF_3$, $TbF_3$, $TiF_3$, $TmF_3$, $YF_3$, $YbF_3$, $TlF_3$, $CeF_4$, $GeF_4$, $HfF_4$, $SiF_4$, $SnF_4$, $TiF_4$, $VF_4$, $ZrF_4$, $NbF_5$, $SbF_5$, $TaF_5$, $BiF_5$, $MoF_6$, $ReF_6$, $SF_6$, and $WF_6$.

The effect of an $AlF_3$ coating on the cycling performance of $LiNi_{1/3}Co_{1/3}Mn_{1/3}O_2$ is described further in an article to Sun et al., "$AlF_3$-Coating to Improve High Voltage Cycling Performance of $Li[Ni_{1/3}Co_{1/3}Mn_{1/3}]O_2$ Cathode Materials for Lithium Secondary Batteries," J. of the Electrochemical Society, 154 (3), A168-A172 (2007). Also, the effect of an $AlF_3$ coating on the cycling performance of $LiNi_{0.8}Co_{0.1}Mn_{0.1}O_2$ is described further in an article to Woo et al., "Significant Improvement of Electrochemical Performance of $AlF_3$-Coated $Li[Ni_{0.8}Co_{0.1}Mn_{0.1}]O_2$ Cathode Materials," J. of the Electrochemical Society, 154 (11) A1005-A1009 (2007), incorporated herein by reference. An increase in capacity and a reduction in irreversible capacity loss were noted with $Al_2O_3$ coatings by Wu et al., "High Capacity, Surface-Modified Layered $Li[Li_{(1-x)/3}Mn_{(2-x)/3}Ni_{x/3}Co_{x/3}]O_2$ Cathodes with Low Irreversible Capacity Loss," Electrochemical and Solid State Letters, 9 (5) A221-A224 (2006), incorporated herein by reference. Metal oxide coatings, including $Al_2O_3$, MgO and $Bi_2O_3$ coatings, are described further in copending provisional patent application Ser. No. 61/253,286 to Venkatachalam et al., entitled "Metal Oxide Coated Positive Electrode Materials for Lithium Ion Batteries," incorporated herein by reference. The use of a $LiNiPO_4$ coating to obtain improved cycling performance is described in an article to Kang et al. "Enhancing the rate capability of high capacity $xLi_2MnO_3 \cdot (1-x)LiMO_2$ (M=Mn, Ni, Co) electrodes by Li—Ni—$PO_4$ treatment," Electrochemistry Communications 11, 748-751 (2009), incorporated herein by reference.

It has been found that metal/metalloid fluoride coatings can significantly improve the performance of lithium rich layered compositions for lithium ion secondary batteries. See, for example, in copending U.S. patent application Ser. No. 12/246,814, now U.S. Pat. No. 8,389,160 to Venkatachalam et al., entitled "Positive Electrode Materials for Lithium Ion Batteries Having a High Specific Discharge Capacity and Processes for the Synthesis of These Materials," U.S. patent application Ser. No. 12/332,735, now U.S. Pat. 8,465,873 to Lopez et al., entitled "Positive Electrode Materials for High Discharge Capacity Lithium Ion Batteries," and copending U.S. patent application Ser. No. 12/616,681 to Lopez et al., entitled "Coated Positive Electrode Materials for Lithium Ion Batteries," all three of which are incorporated herein by reference. The metal fluoride coatings are found to further improve the performance of the doped materials, especially if the amounts of the materials are appropriately balanced. In particular, the coating improves the capacity of the batteries. However, the coating itself is not electrochemically active. When the loss of specific capacity due to the amount of coating added to a sample exceeds where the benefit of adding coating is offset by its electrochemical inactivity, reduction in battery capacity can be expected. In general, the amount of coating can be selected to balance the beneficial stabilization resulting from the coating with the loss of specific capacity due to the weight of the coating material that generally does not contribute directly to a high specific capacity of the material.

In general, the coatings can have an average thickness of no more than 25 nm, in some embodiments from about 0.5 nm to about 20 nm, in other embodiments from about 1 nm to about 12 nm, in further embodiments from 1.25 nm to about 10 nm and in additional embodiments from about 1.5 nm to about 8 nm. A person of ordinary skill in the art will recognize that additional ranges of coating material within the explicit ranges above are contemplated and are within the present disclosure. The amount of $AlF_3$ effective in $AlF_3$ coated metal oxide materials to improve the capacity of the uncoated material can be related to the particle size and surface area of the uncoated material.

The fluoride coating can be deposited using a solution based precipitation approach. A powder of the positive electrode material can be mixed in a suitable solvent, such as an aqueous solvent. A soluble composition of the desired metal/metalloid can be dissolved in the solvent. Then, $NH_4F$ can be gradually added to the dispersion/solution to precipitate the metal fluoride. The total amount of coating reactants can be selected to form the desired amount of coating, and the ratio of coating reactants can be based on the stoichiometry of the coating material. The coating mixture can be heated during the coating process to reasonable temperatures, such as in the range from about 60° C. to about 100° C. for aqueous solutions for from about 20 minutes to about 48 hours, to facilitate the coating process. After removing the coated electroactive material from the solution, the material can be dried and heated to temperatures generally from about 250° C. to about 600° C. for about 20 minutes to about 48 hours to complete the formation of the coated material. The heating can be performed under a nitrogen atmosphere or other substantially oxygen free atmosphere. The formation of inert metal oxide coatings, such as metal oxide coatings and Li—Ni—$PO_4$ coatings are described in the articles cited above.

Electrolyte

The electrolyte has an important role in the battery especially with respect to the stability of the battery with respect to cycling. In some embodiments, the electrolyte can comprise non-aqueous solvent, lithium electrolyte salt and one or more additives. As noted above, the solvent generally comprises a plurality of components. In embodiments of particular interest, the solvent comprises a blend of ethylene carbonate with a room temperature liquid solvent, which can comprise one or more compositions. To stabilize high voltage operation, the solvent is selected to provide stability with respect to oxidation as well as an appropriate additive to stabilize the cycling.

The electrolyte is generally non-aqueous, and water can be considered an undesirable contaminant that can degrade battery components. Of course, trace amounts of water may be present, although processing is generally performed to keep the amount of water contamination very low. As noted above, the solvent generally comprises at least two organic components. Specifically, in some embodiments, the solvent comprises ethylene carbonate, which has a boiling point of about 248° C. and a melting point of about 39-40° C. Thus, ethylene carbonate is a solid at room temperature. A second component of the solvent can comprise dimethylcarbonate, methylethylcarbonate or a mixture thereof. Dimethyl carbonate has a boiling point of 91° C. and melting point of 4.6° C., so it is a volatile liquid at room temperature. Methylethylcarbonate has a boiling point of 107° C. and a melting point of −55° C. The examples below suggest that diethylcarbonate is not a desirable solvent for high voltage operation with conventional lithium salts due to oxidative instability.

Two additional room temperature liquid solvents have been found to have high voltage stability in combination with ethylene carbonate with a lithium salt. Specifically, γ-butyrolactone in combination with ethylene carbonate in a lithium electrolyte is described further in U.S. Pat. No. 5,240,790 to Chua et al., entitled "Lithium-Based Polymer Electrolyte Electrochemical Cell," incorporated herein by reference. γ-butyrolactone has a melting point of −43° C. and a boiling point of 206° C. Similarly, γ-valerolactone in an electrolyte with ethylene carbonate and a lithium salt suitable for high voltage operation is described further in U.S. Pat. No. 6,045,951 to Wendsjö et al., entitled "Non-aqueous Electrolyte System for use in Batteries, Capacitors or Electrochromic Devices and a Method for the Preparation Thereof," incorporated herein by reference. γ-valerolactone has a melting point of −31° C. and a boiling point of 207° C.

Generally, the solvent comprises from about 5 to about 80 volume percent ethylene carbonate, in further embodiments from about 10 to about 75 volume percent ethylene carbonate and in other embodiments from about 15 to about 70 volume percent ethylene carbonate. The ethylene carbonate is a solid at room temperature, while the other solvent components are liquid at room temperature. Room temperature liquid components make up the remaining portion of the solvent. In embodiments of particular interest, the liquid component of the solvent can comprise dimethyl carbonate, methyl ethyl carbonate, γ-butyrolactone, γ-valerolactone or a combination thereof. The relative amounts of the solvent components can be selected to provide desired ion conductivity over the desired operating temperatures of the battery. A person of ordinary skill in the art will recognize that additional ranges of solvent composition within the explicit ranges above are contemplated and are within the present disclosure.

In general, various lithium salts have been suggested for use in secondary lithium ion batteries, such as lithium hexafluorophosphate, lithium hexafluoroarsenate, lithium bis (trifluoromethyl sulfonyl imide), lithium trifluoromethane sulfonate, lithium tris(trifluoromethyl sulfonyl) methide, lithium tetrafluoroborate, lithium perchlorate, lithium tetrachloroaluminate, lithium chloride and combinations thereof. Lithium hexafluorophosphate ($LiPF_6$) and lithium tetrafluoroborate ($LiBF_4$) have been particularly considered for their stability. In particular, $LiPF_6$ or a blend of $LiPF_6$ with up to an equal molar amount of $LiBF_4$ have been suggested as good lithium salts for high voltage lithium ion batteries with $Li_{1+x}Mn_2O_4$ in U.S. Pat. No. 5,192,629 to Guyomard et al., entitled "High-Voltage-Stable Electrolytes for $Li_{1+x}Mn_2O_4$/Carbon Secondary Batteries," and U.S. Pat. No. 5,422,203 to Guymard et al., entitled "Rapid Reversible Intercalation of Lithium Into Carbon Secondary Battery Electrodes," both of which are incorporated herein by references. Others have suggested better cycling stability at low voltage with a higher proportion of $LiBF_4$ as described in U.S. Pat. No. 6,346,351 to Yde-Andersen et al., entitled "Lithium Salt/Carbonate Electrolyte System, a Method for the Preparation Thereof, the Use Thereof and a Battery Containing the Electrolyte System," incorporated herein by reference. However, excellent low voltage cycling has been obtained with $LiPF_6$ as the only lithium salt as described in U.S. patent application Ser. No. 12/509,131, now published application 2011/0017528 to Kumar et al., entitled "Lithium Ion Batteries With Long Cycling Performance," incorporated herein by reference. Generally, the electrolyte comprises the lithium salt in concentrations from about 0.5M to about 2.5 M, in some embodiments from about 1.0M to about 2.25M, in further embodiments from about 1.1M to about 2.0M and in other embodiments from about 1.25M to about 1.85M. Examples below indicate that in some embodiments, surprising stability results from inclusion of lithium salts in concentrations of at least about 1.25M. A person of ordinary skill in the art will recognize that additional ranges of salt concentrations within the explicit ranges above are contemplated and are within the present disclosure.

More complex lithium salts with boron clusters have been suggested as lithium salts for high voltage operation. These lithium salts have the formula $Li_2B_{12}F_xZ_{12-x}$, where Z is H, Cl or Br and x ranges from 5 to 12. These salts are described further in U.S. Pat. No. 7,311,993 to Ivanov et al., entitled "Polyfluorinated Boron Cluster Anions for Lithium Electrolytes," incorporated herein by reference. For these lithium salts, it is suggested that lower concentrations can be effective, although each mole of salt produces two lithium ions. Thus, for these salts, the salt concentration can range from about 0.05M to about 1.5M, and in further embodiments from about 0.1M to about 1M. A person of ordinary skill in the art will recognize that additional ranges of electrolyte salt concentrations within the explicit ranges above are contemplated and are within the present disclosure.

The electrolyte generally also comprises one or more additives. The additives are generally each present in a relatively low amount relative to similar electrolyte components, and appropriate additive concentrations are described further below. Some additives are potential candidates as solvents, but generally their efficacy can be exploited in small amounts as additives. Similarly, some additives are potential candidates as lithium salts, but again their efficacy can be exploited in relatively small amounts as additives. Desirable additives are described further in the following section.

Additives

Additives have been found to be successful at stabilizing the cycling properties of high voltage lithium ion batteries, e.g., batteries with lithium rich positive electrode active compositions described herein. As noted above, some of the additives can comprise a lithium salt while other additives are organic compositions. Some of the organic additive compositions have chemical compositions similar to suitable solvent compositions. The additive compositions can be distinguished from other components by their concentration in the electrolyte. In particular, the selection of the solvent and the electrolyte salt along with the inclusion of one or more additives can improve the cycling stability, and this improvement in stability can provide synergistic improvement in combination with coated positive electrode materials. As described herein, the selection of electrolyte additives can be combined with the inclusion of electroactive materials with excellent properties with respect to energy density and other capacity parameters as well as cycling to result in remarkable performance properties. In particular, the electrolyte should be stable both with respect to resisting chemical changes over the passage of time as well as resisting chemical degradation as a result of the electrochemical reactions in the cell. Furthermore, desirable additives can further stabilize the electroactive materials during cycling.

An additive lithium salt generally can be combined with primary lithium electrolyte salts, which are described further above. In general, with respect to lithium salt stabilization additives, the electrolyte can comprise from about 0.0005 to about 10.0 weight percent, in further embodiments from about 0.01 to about 5.0 weight percent, in other embodiments from about 0.05 to about 2.5 weight percent, and in additional embodiments from about 0.1 to about 1.5 weight percent additive lithium salts. With respect to stabilizing organic additives, the electrolyte can comprise from about 0.0005 to about 15 weight percent, in further embodiments from about 0.01 to about 12 weight percent, in additional embodiments form about 0.05 to about 10 weight percent additive and in further embodiments from about 0.1 to about 7.5 weight percent additive. A person of ordinary skill in the art will recognize that other additive concentration ranges within the explicit ranges above are contemplated and are within the present disclosure.

A class of alternative electrolyte salts is described in U.S. Pat. No. 6,783,896 to Tsujioka et al. ("the '896 patent"), entitled "Electrolyte for Electrochemical Device," incorporated herein by reference. These alternative electrolyte salts are also described as potential electrolyte additives for use in combination with a primary electrolyte salt. In particular, the alternative electrolytes in the '896 patent are ionic complexes formed as lithium salts for the formation of a lithium-based electrolyte with a formula representation as follows:

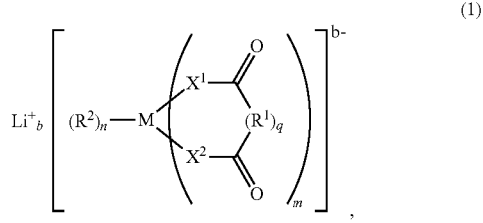

(1)

where b is a number from 1 to 3, m is a number from 1 to 4, n is a number from 1 to 8, q is 0 or 1, M can be a transition metal or an element from groups 13, 14 or 15 of the periodic table, in particular aluminum, boron, phosphorous, arsenic, antimony or silicon, $R^1$ is optional and can be an organic group, $R^2$ is a halogen atom or an organic group, $X^1$ and $X^2$ are independently O, S or $NR^4$, and $R^4$ is a halogen atom or an organic group. In general, $R^1$ can be $C_1$-$C_{10}$ alkylene group, $C_4$-$C_{20}$ arylene group, halogenated forms of these groups, optionally with other substituents and/or heteroatoms and/or rings. $R^2$ can independently be a halogen atom, a $C_1$-$C_{10}$ alkyl group, a $C_4$-$C_{20}$ arylene group, halogenated forms of these groups, optionally with other substituents and/or heteroatoms and/or rings. If $R^2$ are organic groups, a plurality of $R^2$ groups can form bonds with each other to form a ring. In some embodiments of interest, $R^1$ is absent such that the overall group linked by $R^1$ reduces to an oxalato group (—$C_2O_2$—). Compositions of particular interest are represented by formulas where the $R^2$ groups are halogen atoms, e.g., F, and $X^1$ and $X^2$ are O atoms. The '896 patent exemplified $LiBF_2C_2O_4$ (lithium difluoro(oxalato)borate as an electrolyte or in an electrolyte blend.

Other lithium salts with anions based on complexes are described further in U.S. Pat. No. 6,787,267 to Tsujioka et al. (the '267 patent), entitled "Electrolyte for Electrochemical Device," incorporated herein by reference. The '267 patent describes electrolytes represented by a formula:

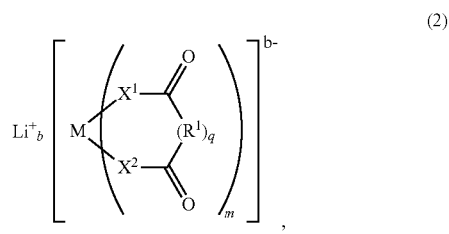

(2)

The same notation is used for moieties in formula (2) as is used for formula (1) above. One compound of interest within this genus is $LiB(C_2O_4)_2$, i.e. lithium bis(oxalato)borate. The combination of lithium bis(oxalato)borate with a solvent comprising a lactone is described further in U.S. Pat. No. 6,787,268 to Koike et al., entitled "Electrolyte," incorporated herein by reference. Furthermore, additives comprising lithium salts with heteroborate cluster anions are described in U.S. patent 2008/0026297 to Chen et al., entitled "Electrolytes, Cells and Methods of Forming Passivation Layers," incorporated herein reference.

Some additives are potentially suitable as solvents, but beneficial effects of the compositions are observed at additive concentrations. For example, another class of additives relate to carbonates. Carbonates have a structure R—OCOO—R', with selected substituents R and R'. As noted above, desirable solvents include some carbonates compounds. Carbonate additives can generally be identified as cyclic unsaturated carbonates. These additives have been identified with the stabilization of the negative electrode with respect to high temperature storage and reduction of the solvent at the negative electrode. Suitable carbonate additives include, for example, vinylene carbonate, vinyl ethylene carbonate, derivatives thereof and combinations thereof. Suitable derivatives of vinylene carbonate generally can have subsitution of hydrogen atoms with C1-C4 alkyl groups. Suitable derivatives of vinyl ethylene carbonate can have C1-C4 alkyl groups substituted for hydrogen atoms on the vinyl group or substitutions for hydrogen atoms on the ethylene carbonate moiety with C1-C4 alkyl groups or C2-C7 alkenyl groups.

The use of vinylene carbonate or vinylethylene carbonate or derivatives thereof as additives is described further in published U.S. patent application 2003/0165733A to Takehara et al., entitled "Nonaqueous Electrolyte Solution and Secondary Battery Employing the Same," incorporated herein by reference. The use of vinylene carbonate with an ethylene sulfite additive and a lithium salt complex additive is described further in published U.S. patent application 2006/

0281012 to Ugawa et al., entitled "Electrolytic Solution and Battery," incorporated herein by reference. The combination of vinylene carbonate with a maleimide compound is described further in published U.S. patent application 2009/0142670 to Wang et al., entitled "Electrolyte Solution and Lithium Battery Employing the Same," incorporated herein by reference. Suitable maleimide compounds include, for example, maleimide, bismaleimide, polymolaimide, polybismaleimide, maleimide bismaeimide copolymer or combinations thereof. This application suggests that the combination of additives react to form a new compound that inhibits the formation of a pasty SEI layer on the negative electrode active materials. Additional carbonate additives in addition to vinylene carbonate and vinylethylene carbonate, include, for example, phenyl ethylene carbonate, phenylvinylene carbonate, diphenylvinylene carbonate, trifluoropropylene carbonate, chloroethylene carbonate, methoxypropylene carbonate, catechol carbonate, tetrahydrofuran carbonate, diphenyl carbonate, diethyldicarbonate and combinations thereof and are described further in U.S. Pat. No. 6,958,198 to Iwamoto et al., entitled "Non-Aqueous Electrochemical Apparatus," incorporated herein by reference.

As noted above, gamma-butyrolactone is a suitable solvent for high voltage lithium ion secondary batteries. Substituted gamma-butyrolactones are suitable additives to reduce reactions at the negative electrode during cycling through the formation of a stable film. Suitable additive compositions include, for example, fluoro γ-butyrolactone, difluoro γ-butyrolactone, chloro γ-butyrolactone, dichloro γ-butyrolactone, bromo γ-butyrolactone, dibromo γ-butyrolactone, nitro γ-butyrolactone, cyano γ-butyrolactone, and combinations thereof. These additives are discussed further in U.S. Pat. No. 7,491,471 to Yamaguchi et al., entitled "Electrolyte for Lithium Secondary Battery and Lithium Secondary Battery Comprising the Same," incorporated herein by reference.

Another group of additives comprise monomers that are capable for undergoing anionic polymerization. During the formation of the battery, a protective film can form on the negative electrode active materials. Suitable monomers can include, for example, isoprene, styrene, 2-vinylpyridine, 1-vinylimidazole, butyl acryate, ethyl acrylate, methyl methacrylate, N-vinylpyrrolidone, ethyl cinnamate, methyl cinnamate, ionone and myrcene. The use of these monomoers as battery additives is described further in U.S. Pat. No. 6,291,107 to Shimizu, entitled "Non-Aqueous Electrolyte Battery," incorporated herein by reference.

Nitrogen containing heterocyclic compounds have been identified as additives for improving high temperature storage characteristics as well as for forming SEI layers. Among other suitable additives, pyrrolidine compounds have been identified, including, for example, 1-alkyl (or alkenyl)pyrrolidone compounds, such as 1-methyl-2-pyrrolidone, 1-ethyl-2-pyrrolidone, 1-vinyl-2-pyrrolidone, 1,5-dimethyl-2-pyrrolidone, 1-isopropyl-2-pyrrolidone, 1-n-butyl-2-pyrrolidone, 1-methyl-3-pyrrolidone, 1-ethyl-3-pyrrolidone, and 1-vinyl-3-pyrrolidone; 1-arylpyrrolidone compounds, such as 1-phenyl-2-pyrrolidone and 1-phenyl-3-pyrrolidone; N-alkylsuccinimide compounds, such as N-methylsuccinimide, N-ethylsuccinimide, N-cyclohexylsuccinimide and N-isobutylsuccinimide; N-alkenylsuccinimide compounds, such as N-vinylsuccinimide; and N-(hetero)arylsuccinimide compounds such as N-phenylsuccinimide, N-(p-tolyl)succinimide, and N-(3-pyridyl-)succinimide. The use of these heterocyclic compounds along with other additive options is described further in published U.S. patent application 2003/0165733 to Takehare et al., entitled "Nonaqueous Electrolyte Solution and Secondary Battery Employing the Same," incorporated herein by reference. Heterocyclic additives including derivatives of succinimide, phthalimide and maleimide are described in published U.S. patent application 2006/0172201 to Yasukawa et al., entitled "Non-Aqueous Electrolyte and Lithium Secondary Battery Using the Same," incorporated herein by reference. Imide stabilizing compounds for lithium metal secondary batteries include N-hydroxylhthalimide, N-hydroxysuccinimide, N,N-disuccinimidyl carbonate, 1,5-bis(succinimidoxycarbonyloxy)pentane, 9-fluorenylmethyl-N-succinimidyl carbonate, N-(benzyloxycarbonyloxy)succinimide and Z-glycine-N-succinimidyl ester, as described in U.S. Pat. No. 6,645,671 to Tsutsumi et al., entitled "Lithium Secondary Battery, Anode for Lithium Secondary Battery, and Method for Manufacturing the Anode," incorporated herein by reference.

Electrolyte additives for stabilizing cells based on spirocyclic hydrocarbons are described in U.S. Pat. No. 7,507,503 to Amine et al. ("the '503 patent"), entitled "Long Life Lithium Batteries with Stabilized Electrodes," incorporated herein by reference. The hydrocarbons contain at least one oxygen atom and at least one alkeneyl or alkynyl group. The spirocyclic additives of particular interest include compositions represented by the formula:

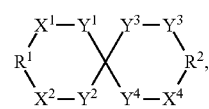

(3)

where $X^1$, $X^2$, $X^3$ and $X^4$ are independently O or $CR^3R^4$, provided that $X^1$ is not O when $Y^1$ is O, $X^2$ is not O when $Y^2$ is O, $X^3$ is not O when $Y^3$ is O and $X^4$ is not O when $Y^4$ is O; $Y^1$, $Y^2$, $Y^3$, and $Y^4$ are independently O or $CR^3R^4$; $R^1$ and $R^2$ are independently a substituted or unsubstituted divalent alkenyl or alkynyl group; and $R^3$ and $R^4$ are independently H, F, Cl, or an unsubstituted alkyl, alkenyl or alkynyl group. The '503 patent described the use of their additives with various lithium salts including, for example, conventional lithium salts. In addition, the '503 patent teaches the use of lithium (chelato)borates or lithium(chelato)phosphates either as the lithium metal salt or as an additive supplementing another lithium salt in the electrolyte. Specifically, the '503 patent describes $Li[(C_2O_4)_2B]$, $Li(C_2O_4)BF_2$ or $LiPF_2C_4O_8$ in concentrations from about 0.0005 to about 15 weight percent in the electrolyte. The '503 patent speculates that the additives protect the electrodes from chemical attack. Specifically, it is suggested in the '503 patent that the additives form a film on the electrodes that prevent non-lithium metal ions, such as $Mn^{+2}$ or $Fe^{+2}$, in the active materials from dissolving into the electrolyte.

The combination of lithium(chelato)borates as a first electrolyte additive and a second additive, which is a organoamine, alkene, aryl compound or mixtures thereof, is described in published U.S. patent application 2005/0019670 to Amine et al., entitled "Long Life Lithium Batteries With Stabilized Electrodes," incorporated herein by reference. Hydrocarbon electrolyte additives that comprising at least one oxygen atom and at least one aryl, alkenyl or alkynl group are described in published U.S. patent application 2006/0147809 to Amine et al., entitled "Long Life Lithium Batteries With Stabilized Electrodes," incorporated herein by reference. Gas suppression additives for lithium ion cells based on unsaturated hydrocarbons generally in the electrolyte in concentrations from 0.1 to 10 weight percent are described in published U.S. patent application 2004/0151951 to Hyung et al. entitled "Lithium Based Electrochemical Cell Systems," incorporated herein by reference.

Battery Performance

Batteries formed with electrolytes and additives described herein have demonstrated superior performance at high voltage operation under realistic discharge conditions for moderate current applications. The electrolytes and additives can be used in combination with active materials that have demonstrated a high specific capacity. Furthermore, some coated positive electrode active materials have demonstrated additional improvement cycling which is demonstrated herein to also be useful at high voltage cycling.

In general, various similar testing procedures can be used to evaluate the capacity performance of the battery positive electrode materials. Some specific testing procedures are described for the evaluation of the performance values described herein. Suitable testing procedures are described in more detail in the examples below. Specifically, the battery can be cycled between 4.5 volts and 2.0 volts at room temperature, although other ranges can be used with correspondingly different results. Also, the specific capacity is very dependent on the discharge rate. The notation C/x implies that the battery is discharged at a rate to fully discharge the battery to the selected voltage minimum in x hours.

With respect to improved cycling, the positive electrode active material can exhibit a specific discharge capacity during the 120th cycle at a discharge rate of C/3 between 4.5V and 2.0V that is at least about 70% of the capacity at the 5th cycle and in further embodiments at least about 72.5% of the capacity at the 5th cycle. A person of ordinary skill in the art will recognize that additional ranges of specific capacity are contemplated and are within the present disclosure.

EXAMPLES

Example 1

Cyclic Voltammetry Analysis of Electrolytes With Different Solvents

This example evaluates the high voltage stability of representative electrolytes with different solvents using cyclic voltametry measurements.

The cyclic voltammetry measurements were performed in a beaker cell. A glassy carbon electrode was used as the working electrode and lithium metal was used as both the counter electrode and the reference electrode. A separator was placed between the lithium metal electrode and the glassy carbon electrode. The electrolyte was placed in the cell contacting the two electrodes. The potential between the electrodes was gradually increased at a selected scan rate. The current flow between the electrodes was measured. A large increase in the negative current indicates that a reaction, specifically oxidation of the electrolyte, is taking place. After reaching the maximum selected potential, the potential is reduced. If the reaction is reversible, a reduction reaction would take place with an opposite flow of current, i.e., positive current. Since the oxidation of the electrolyte is not a completely reversible process, the reduction currents are not seen at the same potentials.

Two electrolytes were studied in the beaker cell. Electrolyte A had a 1.0M $LiPF_6$ electrolyte salt concentration in a solvent of ethylene carbonate, dimethyl carbonate and diethyl carbonate with at least 25 volume percent of each solvent. Electrolyte B had a 1.5M $LiPF_6$ electrolyte salt concentration in a solvent with about 15 to about 70 volume percent ethylene carbonate and dimethyl carbonate making up the remaining portion of the solvent. A scan rate of 10 mV/s was used for the measurements, and the potential was scanned to a selected potential and then reversed. The scans were repeated several times. The scans were respectively performed to maximum potentials of 4.0, 4.2, 4.4, 4.6, 4.8, 5.0, 5.2, 5.4, 5.6, 5.8 and 6.0 volts.

Figure 2:
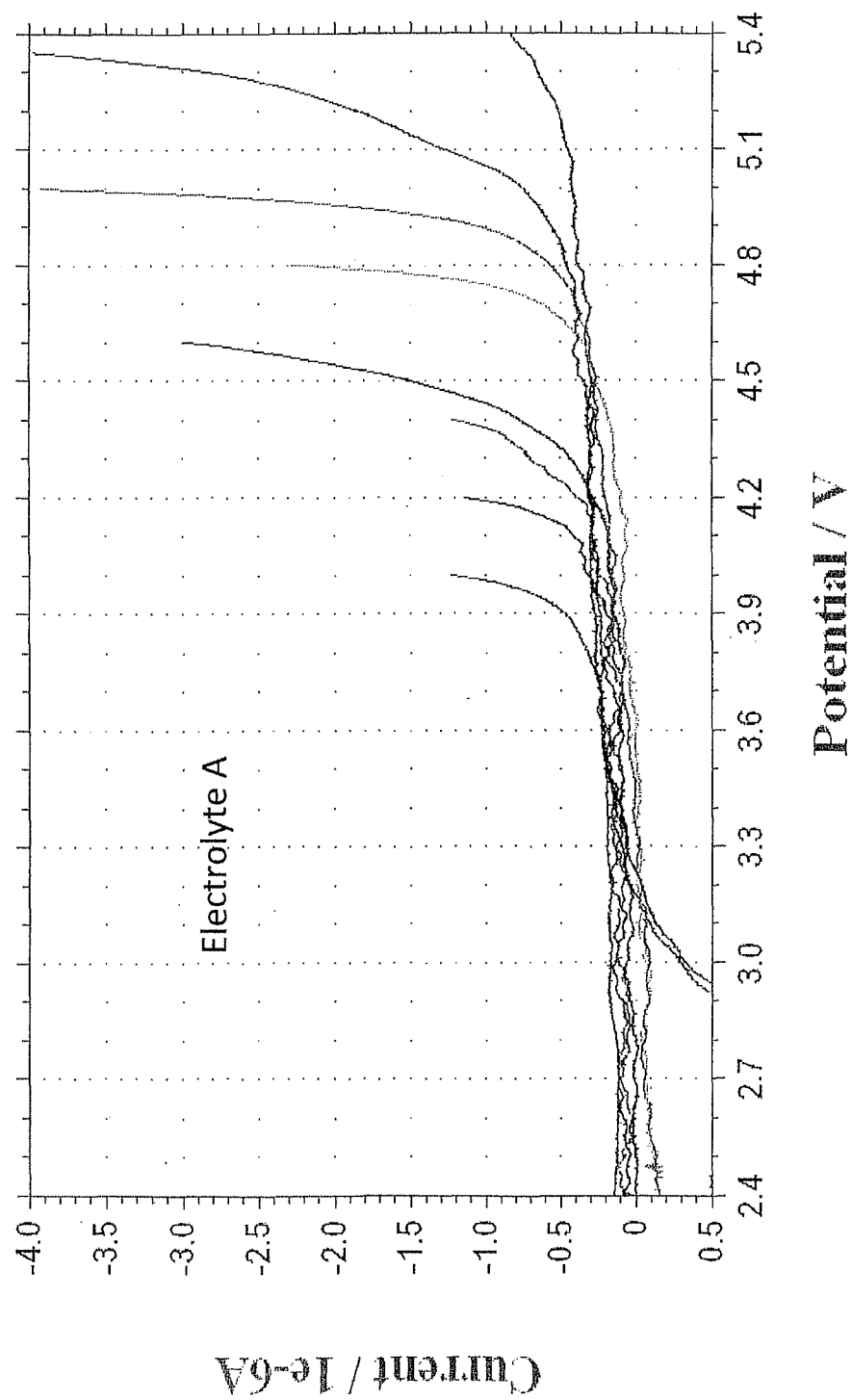
FIG. 2 is a plot of cyclic voltammetry measurements for electrolyte composition A.
Figure 3:
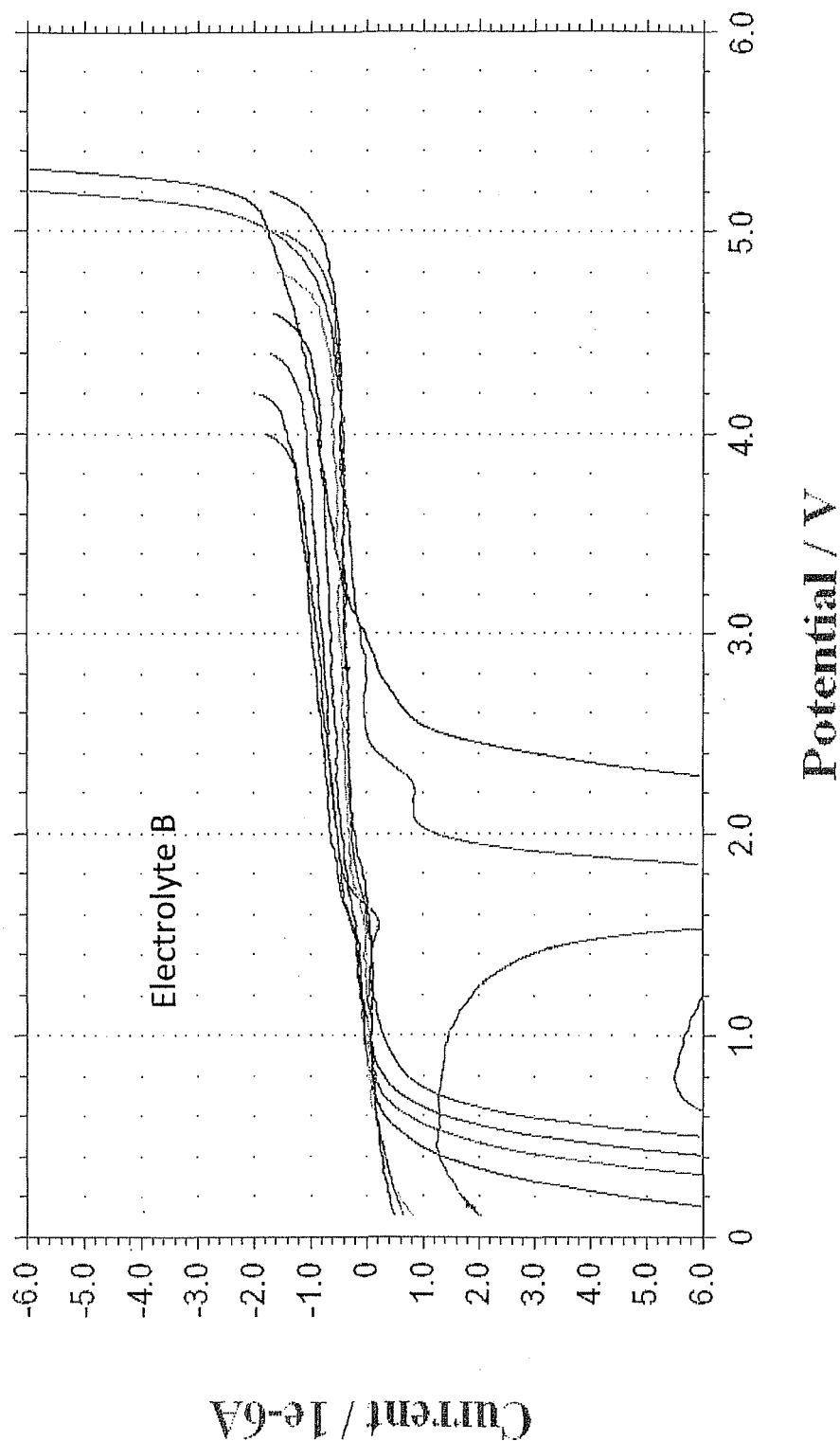
FIG. 3 is a plot of cyclic voltammetry measurements for electrolyte composition B with a different solvent than the first electrolyte.

The cyclic voltammetry results for electrolyte A are plotted in relevant portions in FIG. 2. Electrolyte A exhibited oxidation of the electrolyte between 4.3 and 4.5 volts as indicated by a rapid increase in negative current. The cyclic voltammetry results for electrolyte B are plotted in relevant portions in FIG. 3. Electrolyte B exhibited oxidation of the electrolyte at a potential between 5.2V and 5.4V. Electrolyte B also exhibited a reduction reaction between the range of 2V and 3V.

Example 2

Cyclic Voltammetry Analysis of Electrolytes With Different Salt Concentrations

This example provides information of the oxidative stability of electrolytes with different salt concentrations.

Figure 4:
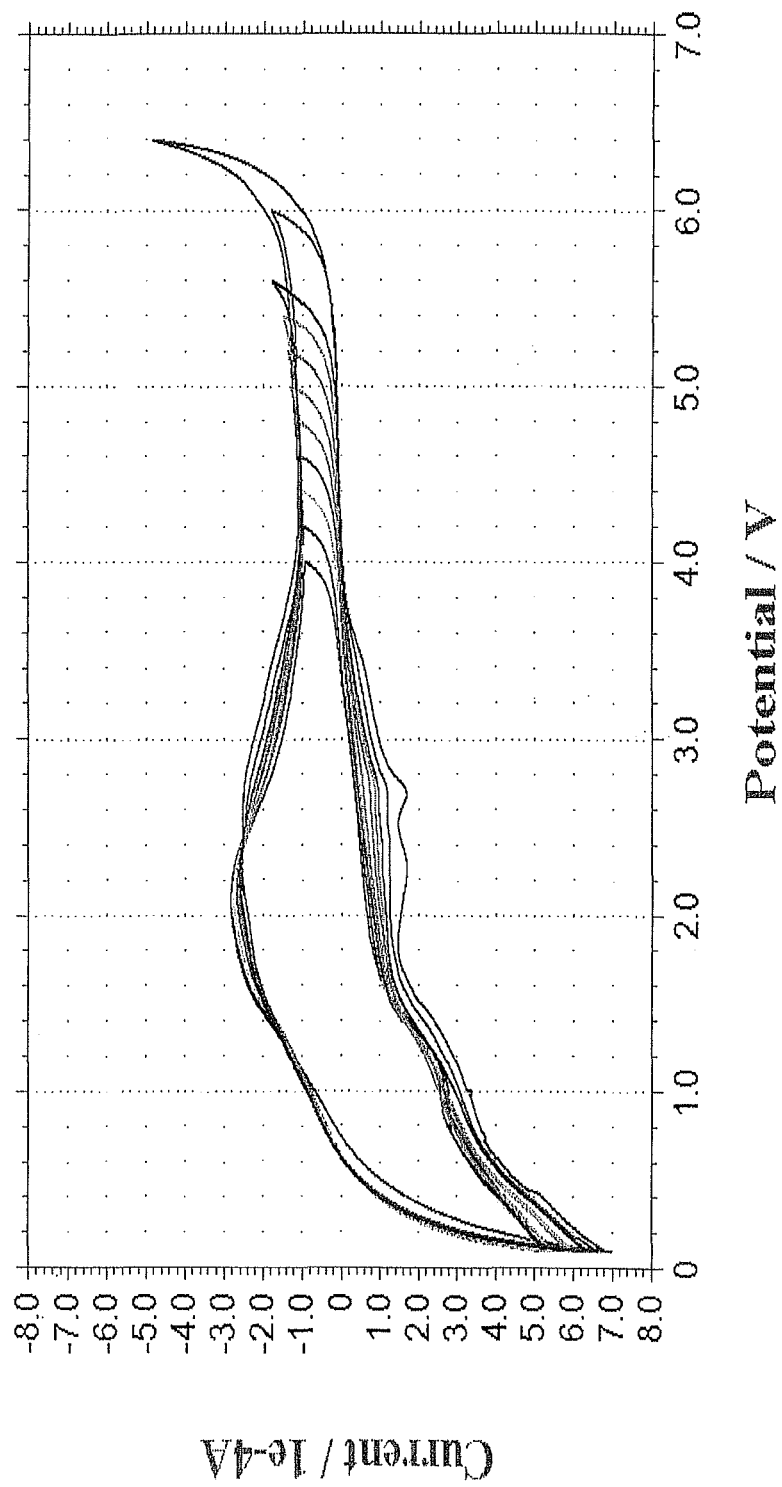
FIG. 4 is a plot of complete forward and reverse cyclic voltammetry measurements for an electrolyte with 1.2M $LiPF_6$ salt concentration.
Figure 5:
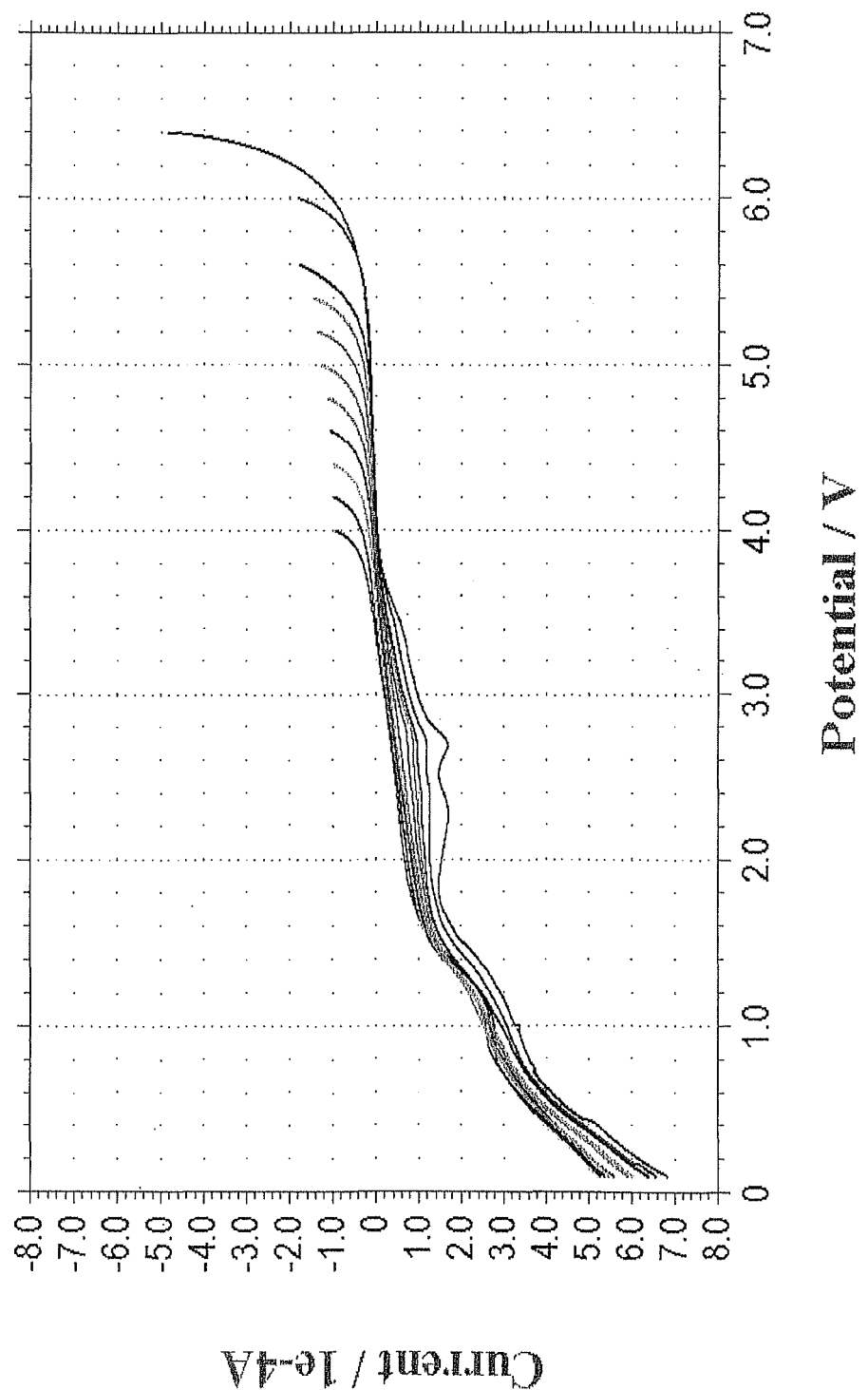
FIG. 5 is a plot of the reverse scans of the measurements shown in FIG. 4.
Figure 6:
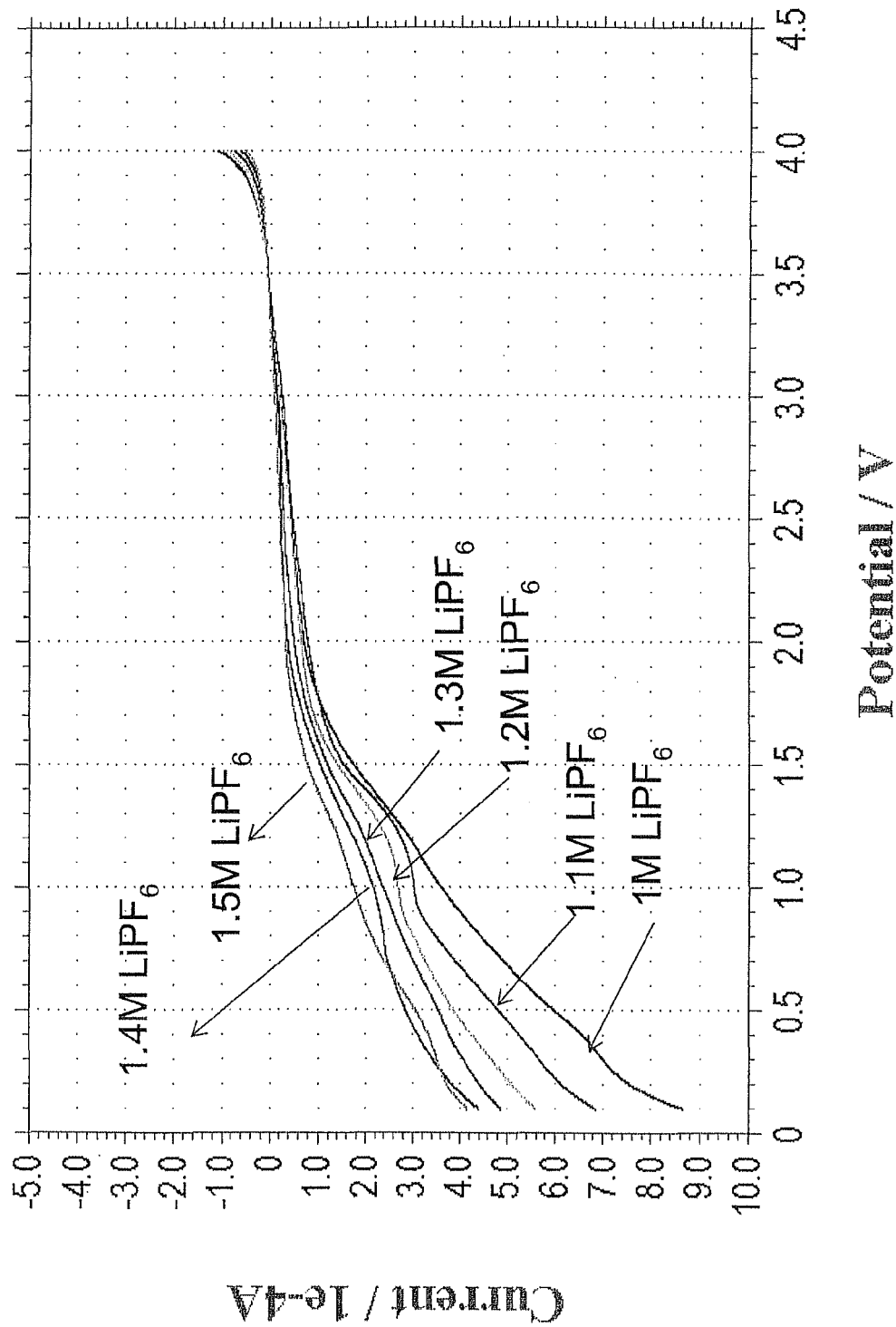
FIG. 6 is a plot of the reverse cyclic voltammetry scans for electrolytes with 6 different salt concentrations taken over a voltage window of 0V to 4.0V.
Figure 7:
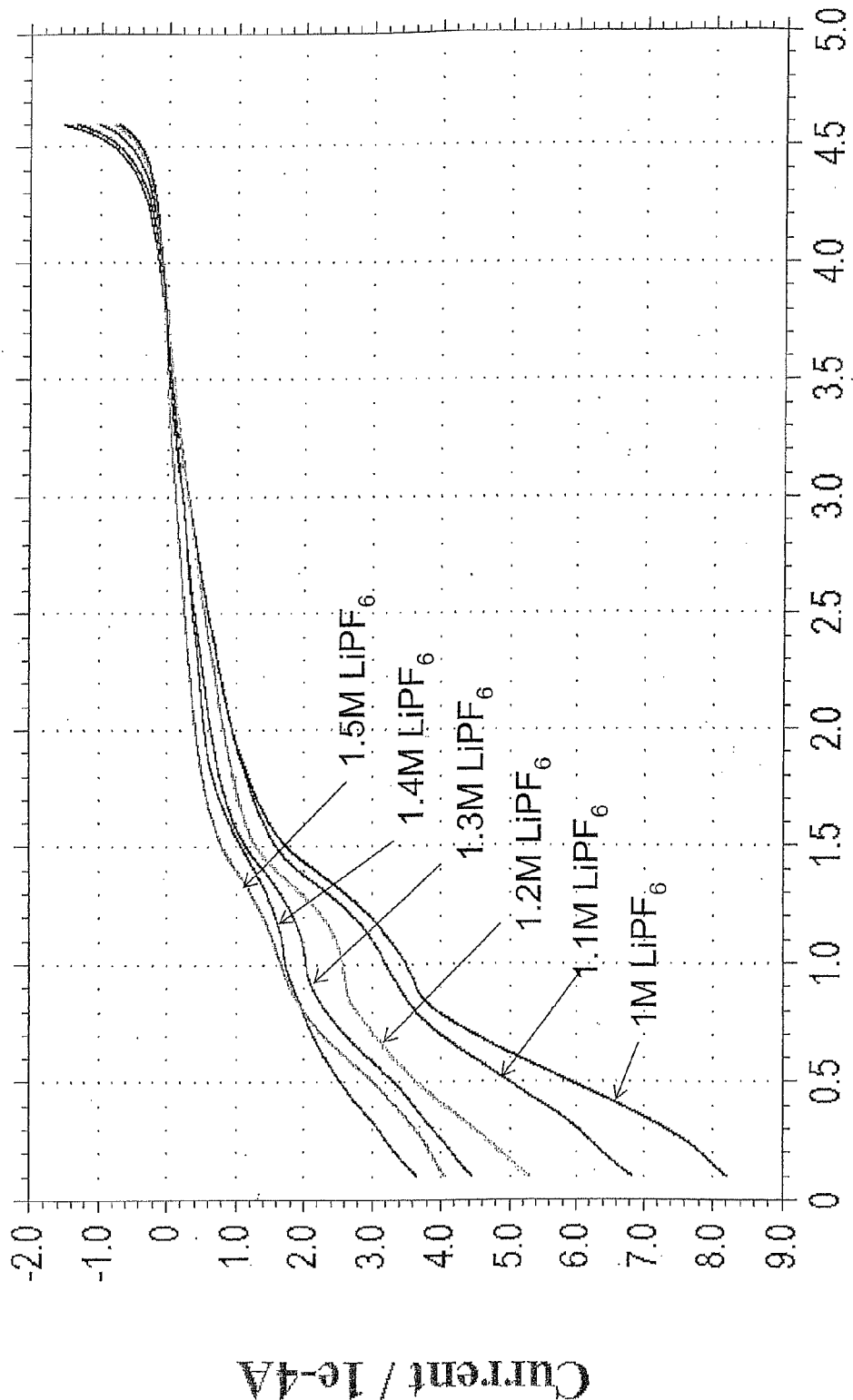
FIG. 7 is a plot of the reverse cyclic voltammetry scans for electrolytes with 6 different salt concentrations taken over a voltage window of 0V to 4.6V.
Figure 8:
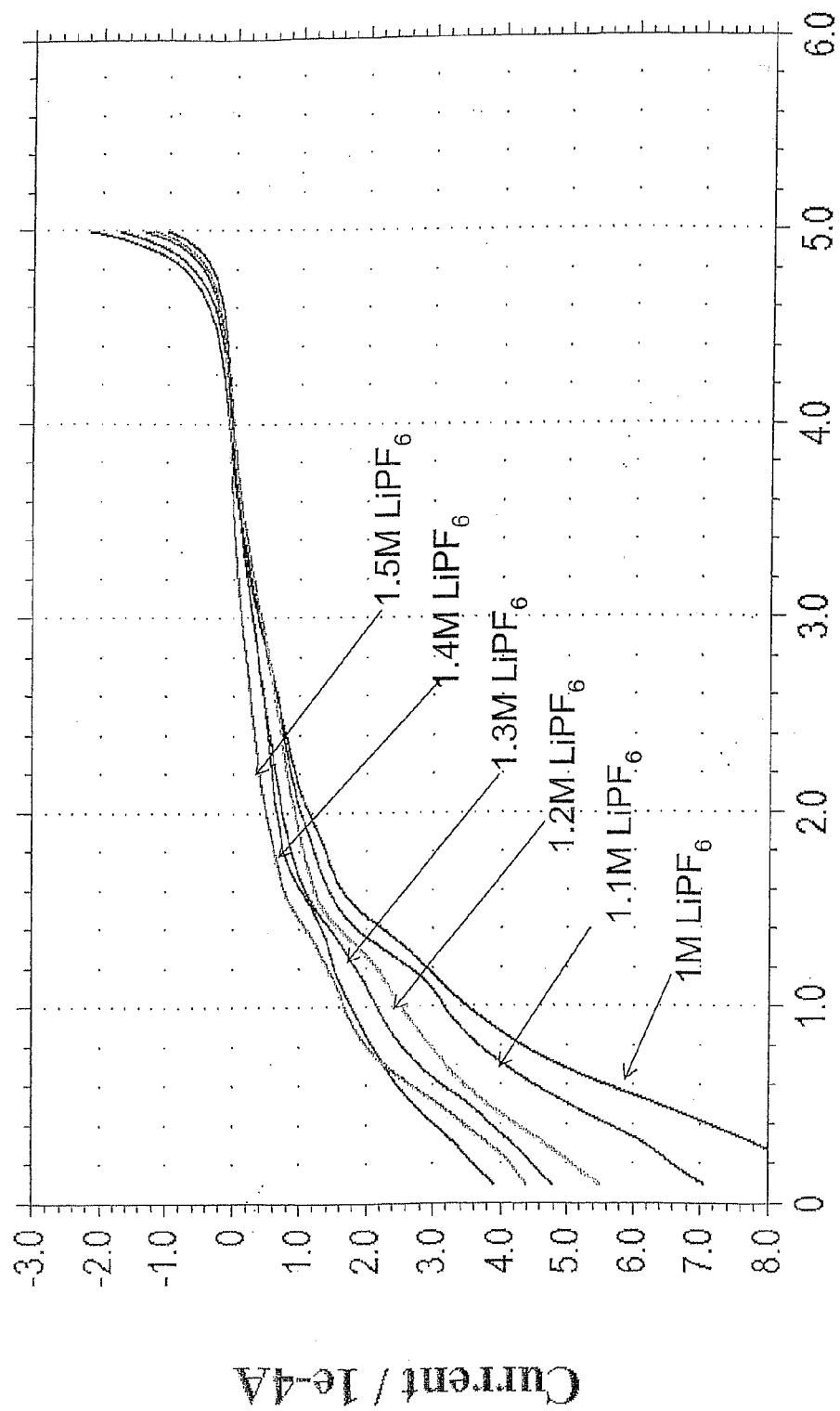
FIG. 8 is a plot of the reverse cyclic voltammetry scans for electrolytes with 6 different salt concentrations taken over a voltage window of 0V to 5.0V.

The cyclic voltammetry was performed similarly to the study described in Example 1 except that the working electrode was platinum. The scan rate was again 10 mV/s. FIG. 4 shows the full cyclic voltammetry plots for an electrolyte with 1.2M $LiPF_6$ in the solvent of electrolyte B of Example 1. For this electrolyte, as the voltage window is increased from 4.0 V to 5.2 V, no increase in current is observed. FIG. 5 shows plots of only the backward scans. It can be observed that the reduction current also does not increase for the electrolytes when the potential is maintained up to 5.2V. When the window is increased past 5.2V, there was an increase associated with the reduction current, which can be clearly observed between 2V and 3V. An increase in current associated with a reduction reaction can only occur if oxidation took place during the forward scan with increasing potential. Hence, it was concluded that for this electrolyte composition, oxidation of the electrolyte occurred around 5.4 V.

Figure 9:
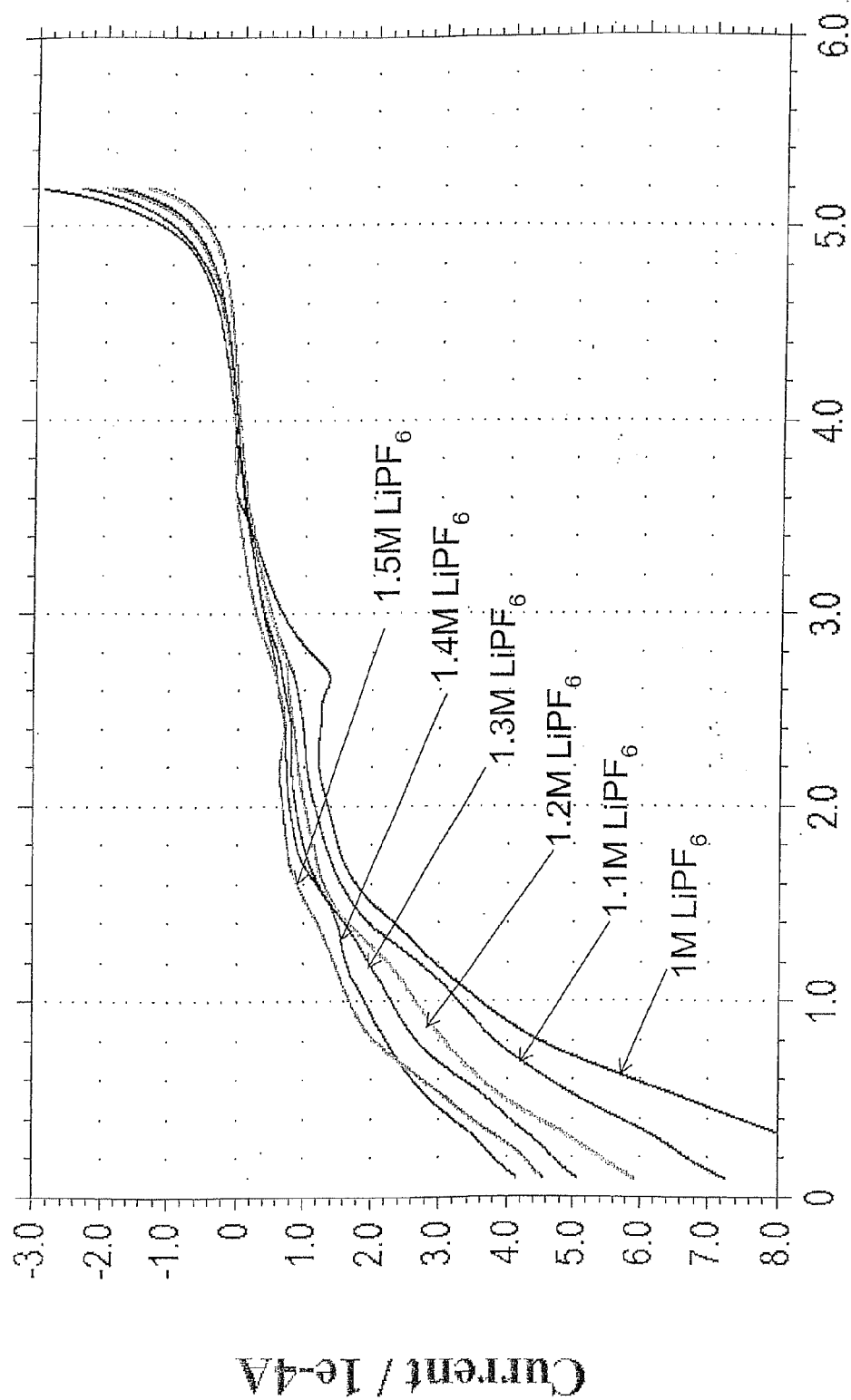
FIG. 9 is a plot of the reverse cyclic voltammetry scans for electrolytes with 6 different salt concentrations taken over a voltage window of 0V to 5.2V.
Figure 10:
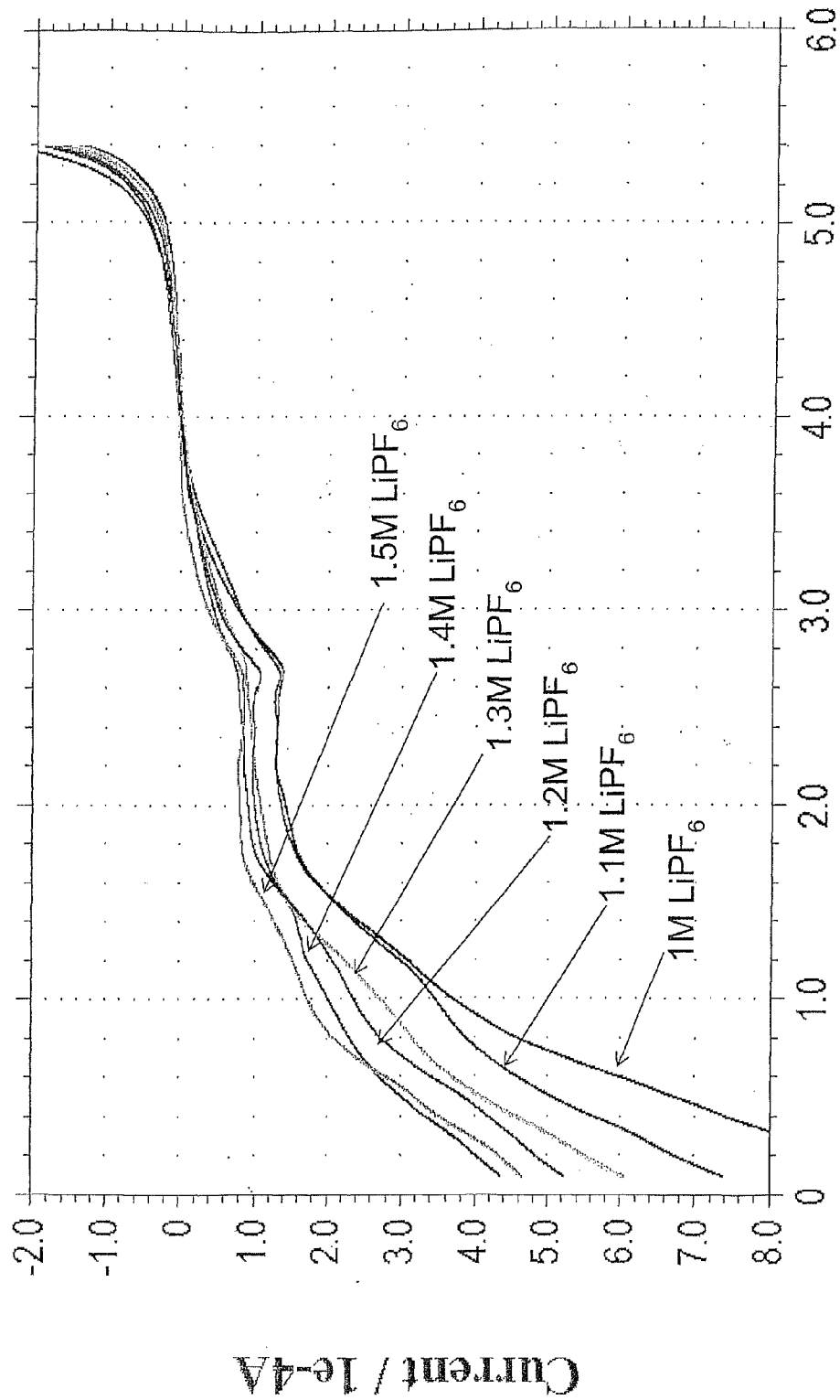
FIG. 10 is a plot of the reverse cyclic voltammetry scans for electrolytes with 6 different salt concentrations taken over a voltage window of 0V to 5.4V.

Cyclic voltammetry studies were also performed for a range of salt concentrations in a solvent with about 15 to about 70 volume percent ethylene carbonate and with dimethyl carbonate making up the remaining portion of the solvent. Specifically, studies were performed with $LiPF_6$ at concentrations of 1.0M, 1.1M, 1.2M, 1.3M, 1.4M and 1.5M. Plots of the backward scans are presented in FIGS. 6-10 over voltage windows, respectively, of 0V-4.0V, 0V-4.6V, 0V-5.0V, 0V-5.2V and 0V-5.4V. No rapid increase of current were observed with voltage windows ends at up to 5.0V, and the similar lack of reduction reaction peak currents clearly indicates that the electrolyte was not oxidized. In FIG. 9, a clear reduction current was observed for the electrolyte with a salt concentration of 1M $LiPF_6$ indicating that oxidation occurred at a voltage less then 5.2V. In FIG. 10, oxidation was observed for electrolytes at a voltage less than 5.4 V with salt concentrations of 1.1M, 1.2M and 1.3M $LiPF_6$. At 5.6 V window cut off voltage, all of the electrolytes tested had results indicating oxidation of the electrolyte. Electrolytes at all of these salt concentrations demonstrated stability at 4.6V.

Battery Examples

The coin cell batteries tested in Examples 3-4 were performed using coin cell batteries produced following a procedure outlined here.

Positive electrodes comprised coated lithium metal oxide particles, electrically conductive particles and a binder coated onto an aluminum foil current collector. The lithium metal oxide particles comprises a lithium rich layer-layer composition approximately represented by the formula $Li_{1.2}Ni_{0.175}Co_{0.10}Mn_{0.525}O_2$. The lithium metal oxide composition was synthesized using a carbonate co-precipitation process, and the lithium metal oxide particles were subsequently coated with aluminum fluoride ($AlF_3$) at an average thickness of about 10 nanometers. Further details of the of carbonate co-precipitation and coating processes can be found in U.S. patent application Ser. No. 12/332,735, now U.S. Pat No. 8,465,873 to Lopez et al, entitled "Positive Electrode Materials for High Discharge Capacity Lithium Ion Batteries," incorporated herein by reference.

The aluminum fluoride coated lithium metal oxide powder was mixed thoroughly with acetylene black (Super P™ from Timcal, Ltd, Switzerland) and graphite (KS 6™ from Timcal, Ltd) to form a homogeneous powder mixture. Separately, Polyvinylidene fluoride PVDF (KF1300™ from Kureha Corp., Japan) was mixed with N-methyl-pyrrolidone (Honeywell-Riedel-de-Haen) and stirred overnight to form a PVDF-NMP solution. The homogeneous powder mixture was then added to the PVDF-NMP solution and mixed for about 2 hours to form a homogeneous slurry. The slurry was applied onto an aluminum foil current collector to form a thin wet film using a doctor's blade coating process. The cathode composition had a loading of active metal oxide powders of greater than 75 weight percent. A positive electrode material was formed by drying the aluminum foil current collector with the thin wet film in vacuum oven at 110° C. for about two hours to remove NMP. The positive electrode material was pressed between rollers of a sheet mill to obtain a positive electrode with desired thickness.

The negative electrode comprised graphite as the active material. To form the negative electrode, Super P™ acetylene black was mixed with NMP, and PVDF binder ((KF9305™ from Kureha Corp., Japan) was added to the NMP and stirred. Graphitic material was added to the solution and stirred. The negative electrode composition was coated onto a copper foil current collector and dried. The negative electrode was then pressed to a desired thickness.

A coin cell battery was formed from the positive electrodes formed as described above. The electrodes were placed inside an argon filled glove box for the fabrication of the coin cell batteries. The specific electrolytes used are described further below in the specific examples. A trilayer (polypropylene/polyethylene/polypropylene) micro-porous separator (2320 from Celgard, LLC, NC, USA) soaked with electrolyte was placed between the positive electrode and the negative electrode. A few additional drops of electrolyte were added between the electrodes. The electrodes were then sealed inside a 2032 coin cell hardware (Hohsen Corp., Japan) using a crimping process to form a coin cell battery. The resulting coin cell batteries were tested with a Maccor cycle tester to obtain charge-discharge curve and cycling stability over a number of cycles.

Example 3

High Voltage Cycling with Different Solvents

The example demonstrates improved cycling of the batteries at high voltage based on appropriate electrolyte selection.

Figure 11:
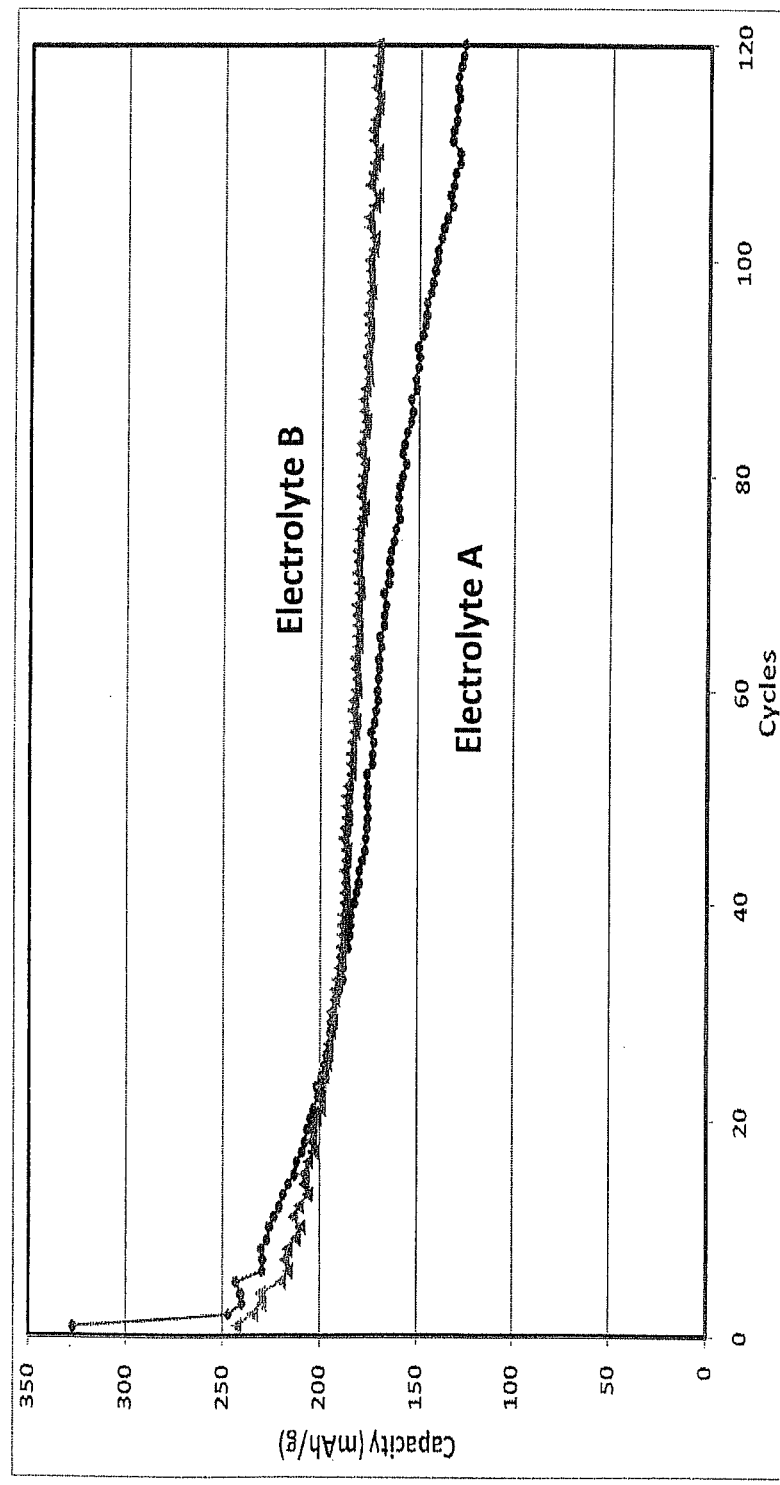
FIG. 11 is a plot of specific discharge capacity as a function of discharge cycle for batteries formed with the first electrolyte and with the second electrolyte.

Batteries were formed with two different electrolytes, Electrolyte A and Electrolyte B, as described in Example 1. Both electrolytes also contained from about 0.0005 weight percent to about 10 weight percent lithium diflouro oxalato borate additive. During the first charge-discharge cycle, the batteries were charged to 4.6 volts at a rate of C/10 and formed at 4.6 volts for seven days. After the rest period, the cells were discharged to 2.0 volts. Cycling was continued between 4.5V and 2.0V at a rate of C/5 for the next three cycles and at C/3 for cycles after the forth cycle. The cycling results out to 120 cycles are plotted in FIG. 11. After 120 cycles, the battery with electrolyte B had a specific capacity about 35% greater than the battery formed with electrolyte A.

Example 4

Effects of Additive Concentration

This example explores the effects of additive concentration on the cycling stability.

Figure 12:
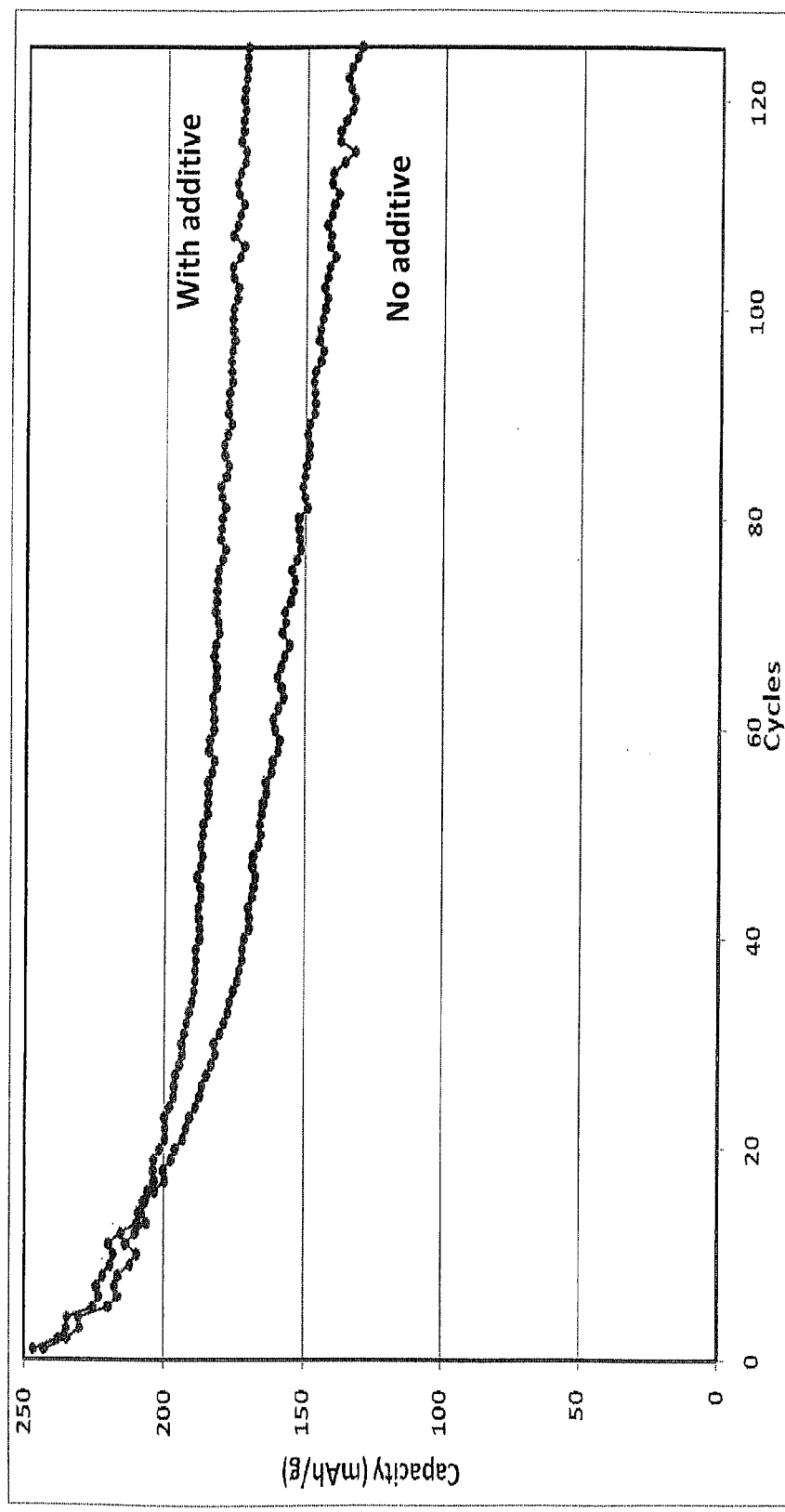
FIG. 12 is a plot of specific discharge capacity as a function of discharge cycle for batteries formed with electrolyte B with and without additive.

The batteries were formed with Electrolyte B of Example 1. Two batteries were formed respectively with no additive and from about 0.0005 weight percent to about 10 weight percent lithium difluoro oxalato borate. During the first charge-discharge cycle, the batteries were charged to 4.6 volts at a rate of C/10 and held at 4.6 volts for seven days. After the rest period, the cells were discharged to 2.0 volts. Cycling was continued between 4.5V and 2.0V at a rate of C/5 for the next three cycles and at C/3 for cycles after the forth cycle. The cycling results out to 125 cycles are plotted in FIG. 12. The batteries with the additive exhibited significantly better cycling performance than the corresponding battery without the additive.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

What is claimed is:

1. A high voltage lithium secondary battery comprising a positive electrode, a negative electrode, an electrolyte and a separator between the negative electrode and the positive electrode, wherein the negative electrode comprises a lithium intercalation/alloying compound and the positive electrode comprises a lithium intercalation material, the electrolyte comprising a primary lithium electrolyte salt, a solvent consisting essentially of ethylene carbonate and a liquid organic solvent selected from the group consisting of dimethyl carbonate, methyl ethyl carbonate, γ-butyrolactone, γ-valerolactone or a combination thereof, and a lithium salt electrolyte stabilizing additive in a concentration from about 0.01 weight percent to about 10 weight percent, wherein the lithium salt electrolyte stabilizing additive is represented by the formula:

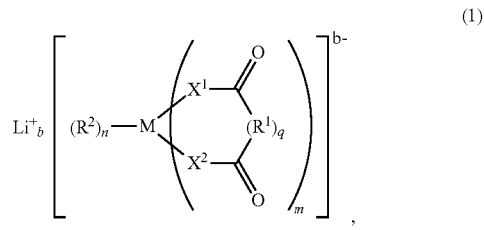

(1)

where b is the charge of the anion, m is a number from 1 to 4, n is a number from 1 to 8, q is 0 or 1, M is Al, B, P, As, Sb, or Si, $R^1$ is a $C_1$-$C_{10}$ alkylene group, $C_4$-$C_{20}$ arylene group, halogenated forms of these groups, optionally with other substituents and/or heteroatoms and/or form rings, $R^2$ is a halogen or a $C_1$-$C_{10}$ alkyl group, a $C_4$-$C_{20}$ arylene group, halogenated forms of these groups, optionally with other substituents and/or heteroatoms and/or form rings, $X^1$ and $X^2$ are independently O, S or $NR^4$, and $R^4$ is a halogen or an organic group.

2. The high voltage lithium secondary battery of claim 1 wherein the electrolyte comprises the lithium salt stabilizing additive in a concentration range from about 0.1 weight percent to about 5.0 weight percent.

3. The high voltage lithium secondary battery of claim 1 wherein M is boron.

4. The high voltage lithium secondary battery of claim 1 wherein the lithium salt electrolyte stabilizing additive is lithium difluoro oxalato borate.

5. The high voltage lithium secondary battery of claim 1 wherein the positive electrode lithium intercalation material comprises a lithium metal oxide represented by a formula $Li_{1+a}Ni_\alpha Mn_\beta Co_\gamma A_\delta O_{2-z}F_z$, where a ranges from about 0.05 to about 0.3, α ranges from about 0.1 to about 0.4, β range from about 0.3 to about 0.65, γ ranges from 0 to about 0.4, δ ranges from about 0 to about 0.15 and z ranges from 0 to about 0.2, and where A is Mg, Sr, Ba, Cd, Zn, Al, Ga, B, Zr, Ti, Ca, Ce, Y, Nb, Cr, Fe, V, Li or combinations thereof.

6. The high voltage lithium ion secondary battery of claim 5 wherein the positive electrode lithium intercalation material has a coating.

7. The high voltage lithium secondary battery of claim 1 wherein the negative electrode lithium intercalation/alloying compound comprises elemental carbon.

8. The high voltage lithium secondary battery of claim 1 wherein the electrolyte has a solvent comprising ethylene carbonate and dimethylcarbonate with a volume ratio of ethylene carbonate to dimethylcarbonate from about 2:1 to about 1:4.

9. The high voltage lithium secondary battery of claim 1 wherein the battery has a cycle life with at least about 70% capacity at 120 cycles relative to cycle 5 at a C/3 discharge from 4,5V to 2.0V.

10. The high voltage lithium secondary battery of claim 1 wherein the positive electrode lithium intercalation material is approximately represented by the formula x $Li_2M'O_3$·(1−x)$LiMO_2$, where M represents one or more metal ions having an average valance of +3 and M' represents one or more metal ions having an average valance of +4.

11. The high voltage lithium secondary battery of claim 10 wherein M' comprises Mn and M comprises Mn, Co and Ni.

12. The high voltage lithium secondary battery of claim 1 wherein the primary lithium electrolyte salt comprises $LiPF_6$ and/or $LiBF_4$.

13. The high voltage lithium secondary battery of claim 1 wherein the primary lithium electrolyte salt has a concentration from about 1.25M to about 2.5M.

14. The high voltage lithium secondary battery of claim 1 wherein the electrolyte is stable up to 4.45 volts.

15. The high voltage lithium ion secondary battery of claim 14 wherein the positive electrode active material has a specific discharge capacity of at least about 175 mAh/g at a discharge rate of C/3 at the $120^{th}$ discharge cycle at room temperature when discharged between 4.5 volts to 2.0 volts.

16. The high voltage lithium secondary battery of claim 14 wherein the battery has a cycle life with at least about 70% capacity at 120 cycles relative to cycle 5 at a C/3 discharge from 4.5V to 2.0V.

17. A high voltage lithium secondary battery comprising a positive electrode, a negative electrode, an electrolyte and a separator between the negative electrode and the positive electrode, wherein the negative electrode comprises a lithium intercalation/alloying compound and the positive electrode comprises a lithium intercalation material, the electrolyte comprising a primary lithium electrolyte salt, a solvent comprising ethylene carbonate and a liquid organic solvent selected from the group consisting of dimethyl carbonate, methyl ethyl carbonate, γ-butyrolactone, γ-valerolactone or a combination thereof, and a lithium salt electrolyte stabilizing additive in a concentration from about 0.01 weight percent to about 10 weight percent, wherein the lithium salt electrolyte stabilizing additive is represented by the formula:

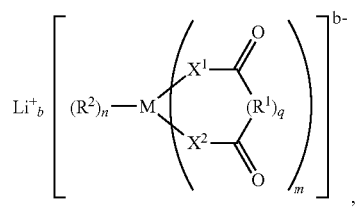

where b is the charge of the anion, m is a number from 1 to 4, n is a number from 1 to 8, q is 0 or 1, M is Al, B, P, As, Sb or Si, $R^1$ is a $C_1$-$C_{10}$ alkylene group, $C_4$-$C_{20}$ arylene group, halogenated forms of these groups, optionally with other substituents and/or heteroatoms and/or form rings, $R^2$ is a halogen or a $C_1$-$C_{10}$ alkyl group, a $C_4$-$C_{20}$ arylene group, halogenated forms of these groups, optionally with other substituents and/or heteroatoms and/or form rings, $X^1$ and $X^2$ are independently O, S or $NR^4$, and $R^4$ is a halogen or an organic group, and wherein the primary lithium electrolyte salt has a concentration from about 1.25M to about 2.0M.

18. The high voltage lithium secondary battery of claim 17 wherein the primary lithium electrolyte salt comprises $LiPF_6$ and/or $LiBF_4$ in a concentration from about 1.25M to about 1.75M.

19. The high voltage lithium secondary battery of claim 17 wherein the electrolyte is stable up to 4.45 volts.

20. The high voltage lithium secondary battery of claim 17 wherein the electrolyte comprises the lithium salt stabilizing additive in a concentration ranging from about 0.1 weight percent to about 5.0 weight percent.

21. The high voltage lithium secondary battery of claim 17 wherein the lithium salt electrolyte stabilizing additive is lithium difluoro oxalato borate.

22. The high voltage lithium secondary battery of claim 17 wherein the solvent of the electrolyte comprises ethylene carbonate and dimethylcarbonate with a volume ratio of ethylene carbonate to dimethylcarbonate from about 2:1 to about 1:4.

23. The high voltage lithium secondary battery of claim 17 wherein the lithium metal oxide is approximately represented by the formula x $Li_2M'O_3$·(1−x)$LiMO_2$, where wherein M' comprises Mn and M comprises Mn, Co and Ni.

* * * * *